United States Patent
Xu et al.

(10) Patent No.: US 10,791,486 B1
(45) Date of Patent: Sep. 29, 2020

(54) METHOD AND SYSTEM FOR SUPPORTING FAST RECOVERY OF USER EQUIPMENT

(71) Applicant: Samsung Electronics Co., Ltd., Suwon-si (KR)

(72) Inventors: Lixiang Xu, Beijing (CN); Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/882,306

(22) Filed: May 22, 2020

Related U.S. Application Data

(63) Continuation of application No. 16/694,964, filed on Nov. 25, 2019, now Pat. No. 10,667,182, which is a
(Continued)

(30) Foreign Application Priority Data

| Dec. 24, 2012 | (CN) | 2012 1 0567595 |
| Oct. 25, 2013 | (CN) | 2013 1 0512150 |
| Nov. 8, 2013 | (CN) | 2013 1 0552962 |

(51) Int. Cl.
| H04W 36/00 | (2009.01) |
| H04W 76/19 | (2018.01) |
| H04W 84/04 | (2009.01) |

(52) U.S. Cl.
CPC ... *H04W 36/0055* (2013.01); *H04W 36/0033* (2013.01); *H04W 76/19* (2018.02); *H04W 84/045* (2013.01)

(58) Field of Classification Search
CPC ......... H04W 36/0033; H04W 36/0055; H04W 76/19; H04W 76/028; H04W 84/045
(Continued)

(56) References Cited

U.S. PATENT DOCUMENTS

| 7,876,729 B1 | 1/2011 | Grilli et al. |
| 2008/0167042 A1 | 7/2008 | Kitazoe |

(Continued)

FOREIGN PATENT DOCUMENTS

| EP | 2302968 A2 | 3/2011 |
| EP | 2324658 A1 | 5/2011 |

(Continued)

OTHER PUBLICATIONS

Office Action dated Jan. 16, 2018 in connection with Australian Patent Application 2013371174.
(Continued)

*Primary Examiner* — Michael Y Mapa

(57) ABSTRACT

A method for supporting fast recovery of a User Equipment (UE) includes performing, by a serving base station, UE context synchronization for one or more other base stations in a related small cell cluster when a UE accesses the serving base station, performing, by a base station that the UE performs a radio resource control (RRC) connection re-establishment, the RRC connection re-establishment for the UE according to UE context saved in a synchronization process. The present also discloses another method and system for supporting UE fast recovery. By applying the technical solution disclosed by the present disclosure, when the UE moves in a small cell scenario, the UE can be recovered quickly in the case of a failure, so as to avoid the UE returns to an idle mode, avoid data loss, guarantee business continuity, and improve UE experience.

22 Claims, 16 Drawing Sheets

Related U.S. Application Data continuation of application No. 16/254,447, filed on Jan. 22, 2019, now Pat. No. 10,492,111, which is a continuation of application No. 16/140,321, filed on Sep. 24, 2018, now Pat. No. 10,368,273, which is a continuation of application No. 14/140,253, filed on Dec. 24, 2013, now Pat. No. 10,136,365.

(58) Field of Classification Search
USPC ............ 455/432.1–444, 448–452.2; 370/331
See application file for complete search history.

(56) References Cited

U.S. PATENT DOCUMENTS

| | | | |
|---|---|---|---|
| 2008/0261600 | A1 | 10/2008 | Somasundaram et al. |
| 2009/0094680 | A1 | 4/2009 | Gupta |
| 2009/0257398 | A1 | 10/2009 | Koyanagi et al. |
| 2010/0178920 | A1 | 7/2010 | Kitazoe et al. |
| 2011/0077010 | A1 | 3/2011 | Xu et al. |
| 2011/0080825 | A1 | 4/2011 | Dimou et al. |
| 2011/0207452 | A1 | 8/2011 | Grob-Lipski et al. |
| 2011/0216735 | A1 | 9/2011 | Venkatachalam et al. |
| 2011/0294508 | A1 | 12/2011 | Min et al. |
| 2012/0003977 | A1* | 1/2012 | Iwamura ........... H04W 36/0033 455/436 |
| 2012/0069732 | A1 | 3/2012 | Xu et al. |
| 2012/0077509 | A1 | 3/2012 | Huang |
| 2012/0142336 | A1 | 6/2012 | Van Phan et al. |
| 2012/0157156 | A1 | 6/2012 | Han et al. |
| 2012/0189016 | A1 | 7/2012 | Bakker et al. |
| 2012/0202557 | A1 | 8/2012 | Olofsson et al. |
| 2012/0276897 | A1 | 11/2012 | Kwon et al. |
| 2012/0307796 | A1* | 12/2012 | Liu ....................... H04W 36/08 370/331 |
| 2013/0059565 | A1 | 3/2013 | Jung et al. |
| 2013/0182555 | A1 | 7/2013 | Raaf et al. |
| 2013/0182563 | A1 | 7/2013 | Johansson et al. |
| 2013/0260811 | A1* | 10/2013 | Rayavarapu .......... H04W 76/19 455/509 |
| 2013/0331105 | A1* | 12/2013 | Olofsson ........... H04W 36/0033 455/438 |
| 2014/0192782 | A1* | 7/2014 | Centonza .......... H04W 36/0005 370/331 |
| 2014/0204733 | A1 | 7/2014 | Takahashi et al. |
| 2015/0257052 | A1 | 9/2015 | Schliwa-Bertling et al. |

FOREIGN PATENT DOCUMENTS

| | | |
|---|---|---|
| EP | 2393322 A1 | 12/2011 |
| JP | 2010-199632 A | 9/2010 |
| KR | 10-2009-0095559 A | 9/2009 |
| RU | 2427981 C2 | 8/2011 |
| WO | 2011/063290 A1 | 5/2011 |
| WO | 2011/137932 A1 | 11/2011 |
| WO | 2011/141313 A2 | 11/2011 |
| WO | 2012/059013 A1 | 5/2012 |
| WO | 2012/093913 A2 | 7/2012 |
| WO | 2013/002166 A1 | 1/2013 |

OTHER PUBLICATIONS

Office Action dated Dec. 8, 2017 in connection with Australian Patent Application 2013371174.
Office Action dated Nov. 30, 2017 in connection with Russian Patent Application 2015124198.
"3rd Generation Partnership Project; Technical Specification Group Radio Access Network; Evolved Universal Terrestrial Radio Access Network (E-UTRAN); X2 application protocol (X2AP)(Release 11)", 3GPP TS 36.423 V11.3.0, Dec. 2012, 141 pages.
"3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", 3GPP TR 36.902 V9.1.0, Mar. 2010, 23 pages.
"Clarification of PLMN ID to be Used in E-CGI and Global eNB ID"; 3GPP TSG RAN WG2 Meeting #65; R2-091947; Athens, Greece; Feb. 9-13, 2009; 3 pages.
"3rd Generation Partnership Project; ETSI Technical Specification; LTE; Evolved Universal Terrestrial Radio Access (E-UTRA) and Evolved Universal Terrestrial Radio Access Network (E-UTRAN); Overall Description; Stage 2"; 3GPP TS 36.300 version 10.8.0 Release 10; Jul. 2012; 210 pages.
Foreign Communication from Related Counterpart Application; Australian Patent Application No. 2013371174; Examination Report No. 3 for Standard Patent Application dated Aug. 7, 2017; 5 pages.
Foreign Communication from Related Counterpart Application; Australian Patent Application No. 2013371174; Australian Office Action dated May 11, 2017; 5 pages.
Foreign Communication From a Related Counterpart Application, Australian Application No. 2013371174, Examination Report No. 1 for Standard Patent Application dated Jan. 17, 2017, 4 pages.
Extended European Search Report dated Jul. 25, 2016 in connection with European Application No. 13866899.1, 12 pages.
3GPP TS 36.423 V11.3.0, "3rd Generation Partnership Project; Technical Specification Group Radio Access Network; Evolved Universal Terrestrial Radio Access Network (E-UTRAN); X2 application protocol (X2AP) (Release 11)", Feb. 2012, 141 pages.
CMCC, et al., "Further Enhancement for MRO Mechanism", 3GPP TSG-RAN WG3 Meeting #69 Meeting, R3-102106, Madrid, Spain, Aug. 23-27, 2010, 4 pages.
International Search Report dated Mar. 26, 2014 in connection with International Patent Application No. PCT/KR2013/012080, 3 pages.
Office Action dated Nov. 29, 2018 in connection with Australian Patent Application 2018200390.
Office Action in connection with Korean Application No. 10-2015-7015773 dated Jan. 21, 2020, 10 pages.
Examination Report in connection with Indian Application No. 3624/CHENP/2015 dated Dec. 31, 2019, 6 pages.
IEEE 802.16ppc-11/0004r2, "Hierarchical Network Study Report," Broadband Wireless Access Working Group, Nov. 9, 2011, 33 pages.

\* cited by examiner

METHOD AND SYSTEM FOR SUPPORTING FAST RECOVERY OF USER EQUIPMENT

CROSS-REFERENCE TO RELATED APPLICATIONS

The present application is a continuation of U.S. patent application Ser. No. 16/694,964 filed on Nov. 25, 2019, which is a continuation of U.S. patent application Ser. No. 16/254,447 filed on Jan. 22, 2019 now U.S. Pat. No. 10,492,111 issued on Nov. 26, 2019, which is a continuation of U.S. patent application Ser. No. 16/140,321 filed on Sep. 24, 2018 now U.S. Pat. No. 10,368,273 issued on Jul. 30, 2019, which is a continuation of U.S. patent application Ser. No. 14/140,253 filed on Dec. 24, 2013 now U.S. Pat. No. 10,136,365 issued on Nov. 20, 2018, which is based on and claims priority under 35 U.S.C. § 119 to Chinese Patent Application No. 201210567595.X filed on Dec. 24, 2012, Chinese Patent Application No. 201310512150.6 filed on Oct. 25, 2013 and Chinese Patent Application No. 201310552962.3 filed on Nov. 8, 2013 in the State Intellectual Property Office, the disclosures of which are herein incorporated by reference in their entirety.

BACKGROUND

1. Field

The present disclosure relates to wireless communication technology, and more particularly, to a method for supporting UE fast recovery.

2. Description of Related Art

Modern mobile communication tends to be more to provide multimedia services with high-speed transmission. FIG. 1 is a schematic diagram illustrating a structure for a system of system architecture evolution (SAE).

A user equipment (UE) 101 is a terminal device used to receive data. An evolved universal terrestrial radio access network (E-UTRAN) 102 is a wireless access network, which includes a macro base station (eNodeB/NodeB) providing an interface for the UE to access the wireless network. A mobility management entity (MME) 103 is responsible for managing mobility context, session context and security information of the UE. A service gateway (SGW) mainly provides a user-plane function. The MME 103 and the SGW 104 may be deployed in a same physical entity. A packet data network gateway (PGW) 105 is responsible for functions such as charging, lawful monitoring and so on, also may be deployed in a same physical entity with the SGW 104. A policy and charging rule functional entity (PCRF) 106 provides a principle of quality of service (QoS) and a charging rule. A Serving GPRS Support Node (SGSN) 108 is a network node device, which provides routing for data transmission in Universal Mobile Telecommunications System (UMTS). A Home Subscriber Server (HSS) 109 is a home sub-system of the UE, which is responsible for protecting user information such as a current position, an address of a service node, user security information, packet data context of the user equipment and so on.

A small cell enhancement requirement is provided in 3GPP Release 12 (Rel-12). As shown in FIG. 2, target scenarios of small cell enhancement include a scenario with macro cell coverage and a scenario without the macro cell coverage, an indoor scenario and an outdoor scenario, a scenario with an ideal backhaul and a scenario with a non-ideal backhaul.

In a condition with the macro cell coverage, a carrier aggregation technology is provided, which is applied among different base stations. A macro cell and a small cell may work on different frequency bands. In a condition without the macro cell coverage, there is no a specific solution how to enhance small cell performance.

SUMMARY

To address the above-discussed deficiencies, it is a primary object to provide a method for supporting UE fast recovery. When a UE moves in a small cell scenario, the UE can be recovered quickly in the case of a failure, so as to avoid the UE returns to an idle mode, avoid data loss, guarantee service continuity, and improve UE experience.

The present disclosure provides a method for supporting UE fast recovery, which includes: A) performing, by a serving base station, UE context synchronization for one or more other base stations in a small cell cluster of the serving base station when a UE accesses the serving base station; B) performing, by a base station that the UE performs a radio resource control (RRC) connection re-establishment, the RRC connection re-establishment for the UE according to UE context saved in a synchronization process.

Preferably, the UE accesses the serving base station includes: the UE changes from an idle mode to an active mode in a cell of the serving base station; and performing, by a serving base station, UE context synchronization for one or more base stations in a small cell cluster of the serving base station comprises transmitting, by the serving base station, the UE context of the UE to the one or more base stations in a small cell cluster of the serving base station, saving, by the one or more base stations, the UE context.

Preferably, the method further includes: transmitting, by the serving base station, updated UE context to the one or more base stations in the small cell cluster of the serving base station, saving, by the one or more base stations, the updated UE context when the UE context needs to be updated; transmitting, by the serving base station, a message of releasing the UE context to a corresponding base station in the small cell cluster of the serving base station, releasing, by the corresponding base station, corresponding UE context when the UE returns to the idle mode from the active mode in the cell of the serving base station, or when the UE moves out of the cell of the serving base station, or when the UE moves out of the cell of the serving base station and a target cell is not in the small cell cluster of the serving base station.

Preferably, the UE accesses the serving base station comprises the UE accesses the cell of the serving base station through handover; and performing, by a serving base station, UE context synchronization for one or more other base stations in a small cell cluster of the serving base station comprises synchronizing the UE context to a base station in a target small cell cluster, and releasing the UE context in a base station in a source small cell cluster; wherein the source small cell cluster refers to the small cell cluster of the source base station; the target small cell cluster refers to a small cell cluster of a target base station.

Preferably, before the A, the method further includes: exchanging, by a first base station and a second base station, information of small cell clusters during a process of establishing an X2; or exchanging, by the first base station and the second base station, the information of the small cell clusters through a core network via an S1 interface; or broadcasting, by the first base station, the information of a small cell cluster of the first base station, obtaining, by the UE, the information of the small cell cluster of the first base station from broadcast information of the first base station, and transmitting the information of the small cell cluster of the first base station to the second base station; or exchanging, by the first base station and the second base station, the information of the small cell clusters during an X2 handover process; or exchanging, by the first base station and the second base station, the information of the small cell clusters during an S1 handover process; wherein the information of a small cell cluster refers to a identifier of the small cell cluster of one or more base stations or a list of the one or more base stations in the small cell cluster of the one or more base station, the list of the one or more base stations refers to a list of one or more base station identifiers, or a list of one or more base station IP addresses, or a list of information that may identify the one or more base stations.

Preferably, synchronizing the UE context to a base station in a target small cell cluster, and releasing the UE context in a base station in a source small cell cluster includes three ways: a first way is: transmitting, by the target base station, the UE context to one or more other base stations in the target small cell cluster, saving, by the one or more other base stations, the UE context; transmitting, by the source base station, the message of releasing the UE context to the base station in the source small cell cluster, releasing, by the one or more other base stations, corresponding UE context; a second way is: updating, by the target base station, the UE context for a base station in both the source small cell cluster and in target small cell cluster; transmitting, by the target base station, the UE context to a base station in the target small cell cluster but not in the source small cell cluster; transmitting, by the source base station, the message of releasing the UE context to a base station in the source small cell cluster but not in the target small cell cluster; a third way is: updating, by the target base station, the UE context for the base station in both the small cell cluster and the target small cell cluster; transmitting, by the target base station, the UE context to the base station in the target small cell cluster but not in the source small cell cluster; transmitting, by the target base station, the message of releasing the UE context to the base station in the source small cell cluster but not in the target small cell cluster.

Preferably, obtaining, by the source base station of the UE, the one or more other base stations in the small cell cluster of the source base station include: obtaining, by the source base station, the one or more other base stations in the small cell cluster of the source base station according to configuration information; or taking, by the source base station, one or more base stations around a cell accessed by the UE currently as the one or more base stations in the small cell cluster of the source base station according to the cell accessed by the UE currently; or determining, by the source base station, one or more base stations of one or more small cells around according to a measurement report of the UE, taking the one or more other base stations as the one or more base stations in the small cell cluster of the source base station according to a measurement report of the UE; obtaining, by the source base station, a group of small cells according to the configuration information, filtering the configured group of the small cells according to the measurement report of the UE, obtaining the one or more other base stations in the small cell cluster of the source base station.

Preferably, the UE context includes a cell identifier of the cell accessed by the UE in the source base station and an identifier of the UE in the cell accessed by the UE; the UE context further includes one or more kinds of information as follows: UE security context, ERAB information, source MME information, an identifier of the UE in a source MME, UE capability, a handover limitation list, UE history information.

The present disclosure provides another method for supporting UE fast recovery, which includes: transmitting, by a UE, a RRC re-establishment request message to a second base station; requesting, by the second base station, UE context to a first base station, wherein the first base station is a serving base station before the failure occurs for the UE; transmitting, by the first base station, the UE context of the UE to the second base station; and performing, by the second base station, a RRC connection re-establishment according to the received UE context.

Preferably, the UE context includes a cell identifier of the cell where the failure occurs for the UE and an identifier of the UE in the cell where the failure occurs for the UE; the UE context further includes one or more kinds of information as follows: UE security context, ERAB information, source MME information, an identifier of the UE in a source MME, UE capability, a handover limitation list, UE history information.

Preferably, the method further includes: performing, by the first base station or the second base station, security check.

Preferably, the method further includes: performing, by the first base station or the second base station, access check.

It can be seen from the above technical solution that when the UE moves in the small cell scenario, the method for supporting UE fast recovery provided by the present disclosure causes that the base station in the related small cell cluster can obtain the UE context by taking different methods. Thus, when a failure occurs for the UE and the UE performs the RRC connection re-establishment, the base station that the UE performs the RRC connection re-establishment can obtains the UE context, so that the RRC re-establishment can succeed and it is avoided that the UE returns to the idle mode, data is lost and service continuity is guaranteed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 3 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

In order to make the technical scheme and advantages of the present disclosure clearer, the present disclosure is described in further detail hereinafter with reference to accompanying drawings and examples.

When a UE moves in a small cell scenario, a failure can occur. In order to enable the UE to be recovered fastly in a failure condition, the present disclosure provides two methods for supporting UE fast recovery so as to avoid that the UE returns to an idle mode, avoid data loss and guarantee service continuity.

A main idea of a first method is that: when a UE accesses a serving base station, the serving base station accessed by the UE performs UE context synchronization to one or more other base stations in a small cell cluster of the serving base station. Thus, when a failure occurs for the UE and the UE needs to re-establish an RRC connection, since a base station which receives the RRC connection reestablishment request message saves UE context information, the RRC re-establishment can succeed.

A main idea of a second method is that: when a failure occurs for a UE and the UE needs to re-establish a RRC connection, a base station which receives the RRC connection re-establishment request message requests UE context from a base station lastly serving the UE before the failure, so that an RRC re-establishment can succeed.

A common point of the above two methods are: a base station which receives the RRC connection reestablishment request message obtains UE context through adopting different methods. Thus, an RRC re-establishment can succeed. It is avoided that the UE returns to an idle mode and data is lost. Service continuity is guaranteed as well.

The two methods provided by the present disclosure are instructed in detail as follows.

Figure 1:
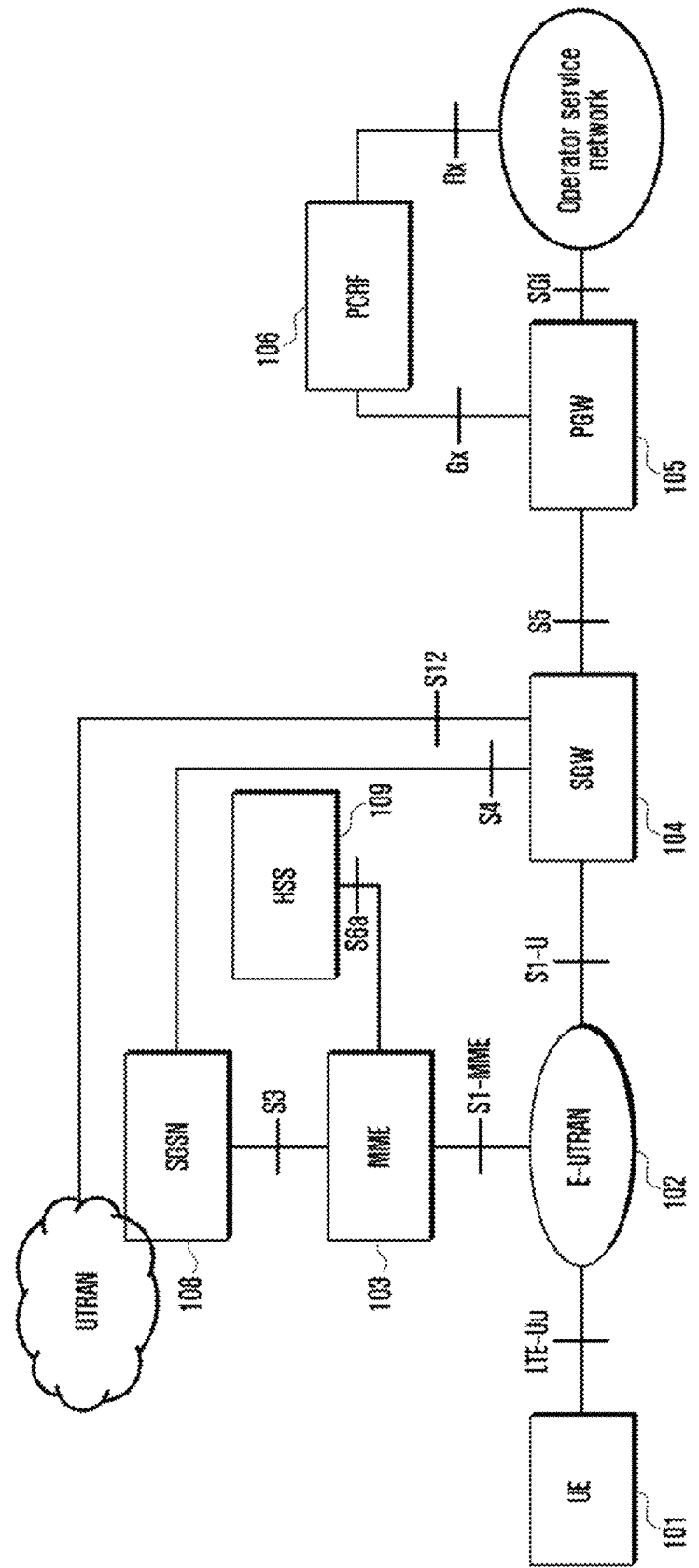
FIG. 1 is a schematic diagram illustrating a current structure for a system of system architecture evolution (SAE)
Figure 2:
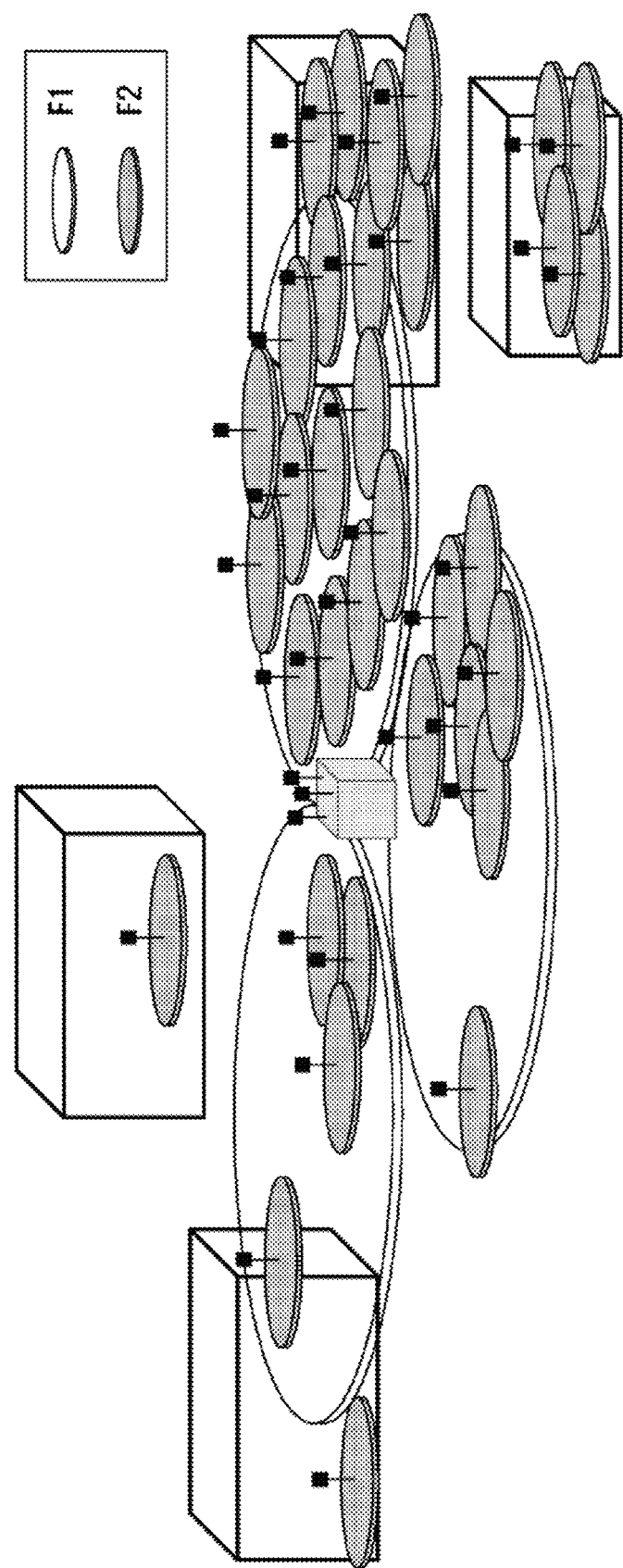
FIG. 2 is a deployment scenario of small cell enhancement.
Figure 3:
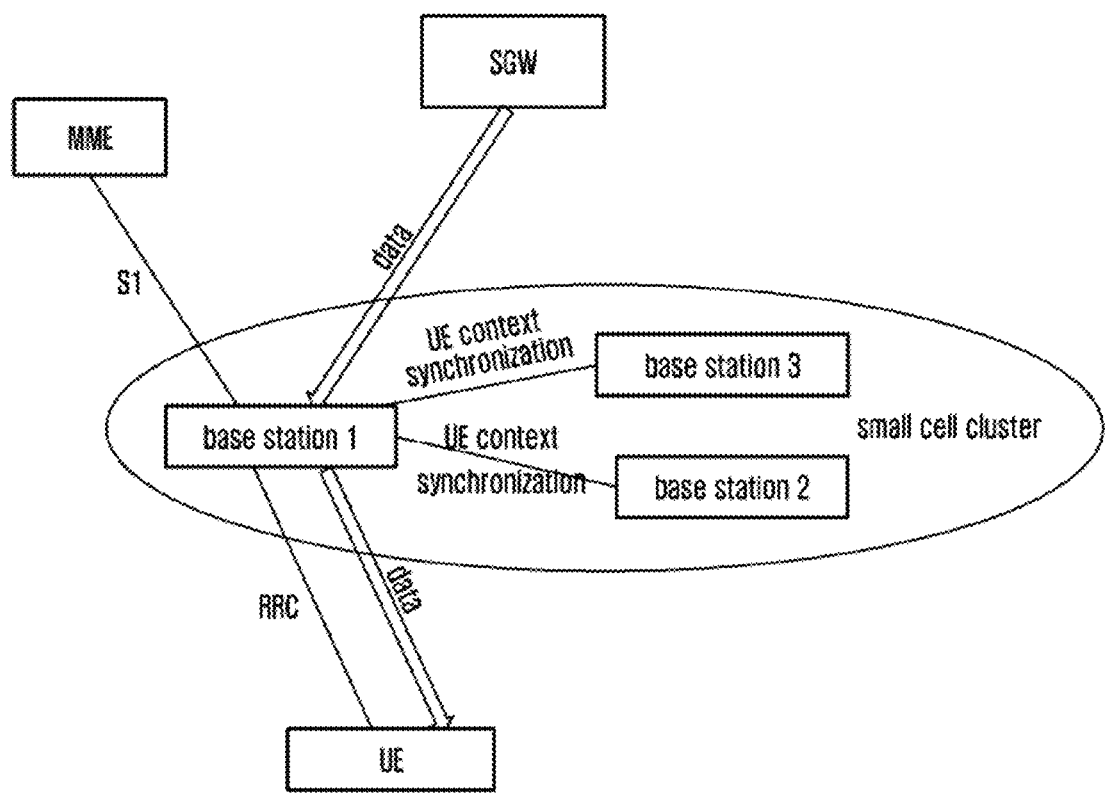
FIG. 3 is a schematic diagram illustrating a first method for supporting UE fast recovery in accordance with an embodiment of the present disclosure.

FIG. 3 is a schematic diagram illustrating a first method for supporting UE fast recovery.

A small cell cluster is composed by some base stations of small cell. A network can configure some base stations of small cell to compose the small cell cluster according to a geographical area. Alternatively, according to difference of a small cell accessed by the UE, the small cell cluster can be composed by some base stations around a base station of the small cell. When the UE accesses a base station of the small cell cluster, a serving base station accessed by the UE transmits UE context to one or more other base stations in the small cell cluster. Afterwards, when the UE context updating occurs or the UE context needs to be released, the base station accessed by the UE notifies the one or more other base stations in the small cell cluster to perform UE context updating or release. For example, according to FIG. 3, base station 1 synchronizes UE context to base station 2 and base station 3.

Figure 4:
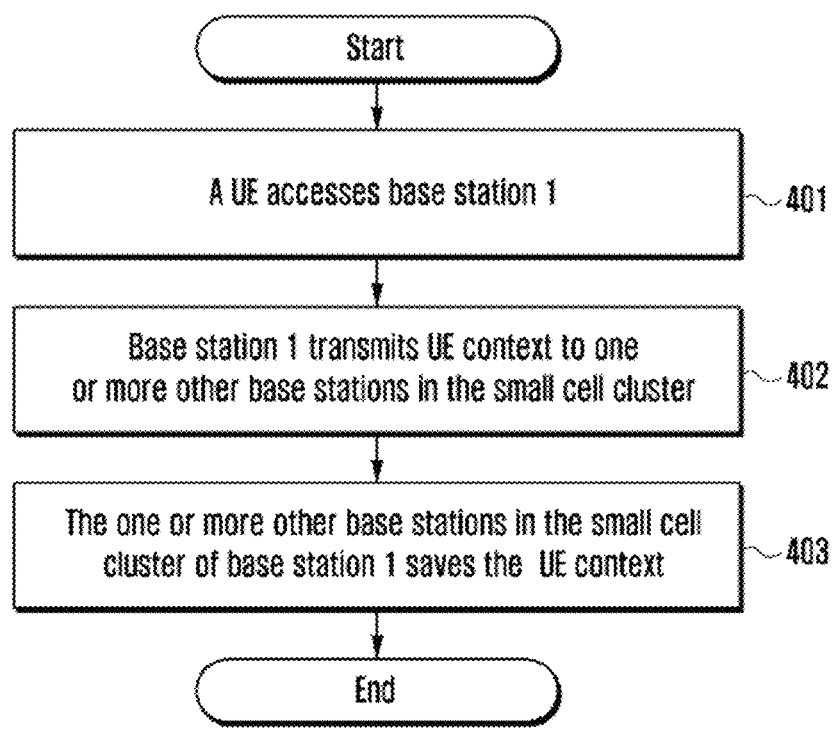
FIG. 4 is a schematic diagram illustrating a process that a UE accesses a small cell in accordance with an embodiment of the present disclosure.

In the above first method, a process that a UE accesses a small cell is shown in FIG. 4, and includes steps as follows:

In step 401, the UE accesses base station 1. Herein, it is assumed that base station 1 is a base station of a small cell, and base station 1 is included in a small cell cluster.

The process that the UE accesses base station 1 can be that: the UE is changed from an idle mode to an active mode in a cell of base station 1. Alternatively the UE accesses the cell of base station 1 through handover (in this condition, base station 1 is a target base station of the handover).

In step 402, base station 1 transmits UE context to one or more other base stations in the small cell cluster, e.g., eNB2 and eNB3 as shown in FIG. 3.

The UE context includes one or more kinds of information as follows: UE security context, ERAB information, Source MME information, an identifier of the UE in a source MME UE capability, a handover limitation list, and UE history information.

The UE context can also include a cell identifier of a cell accessed by the UE in base station 1 (that is, a cell accessed by the UE in base station 1). The UE context can also include frequency information of the cell accessed by the UE in base station 1. Alternatively, the cell identifier can be an E-UTRAN Cell Global Identifier (ECGI). The UE context also includes the identifier of the UE in the cell accessed by the UE in base station 1. The identifier of the UE can be CRNTI. The UE context can also include other UE context information, which is not limited in the present disclosure.

In step 403, a base station receiving the UE context saves the UE context information.

Figure 8:
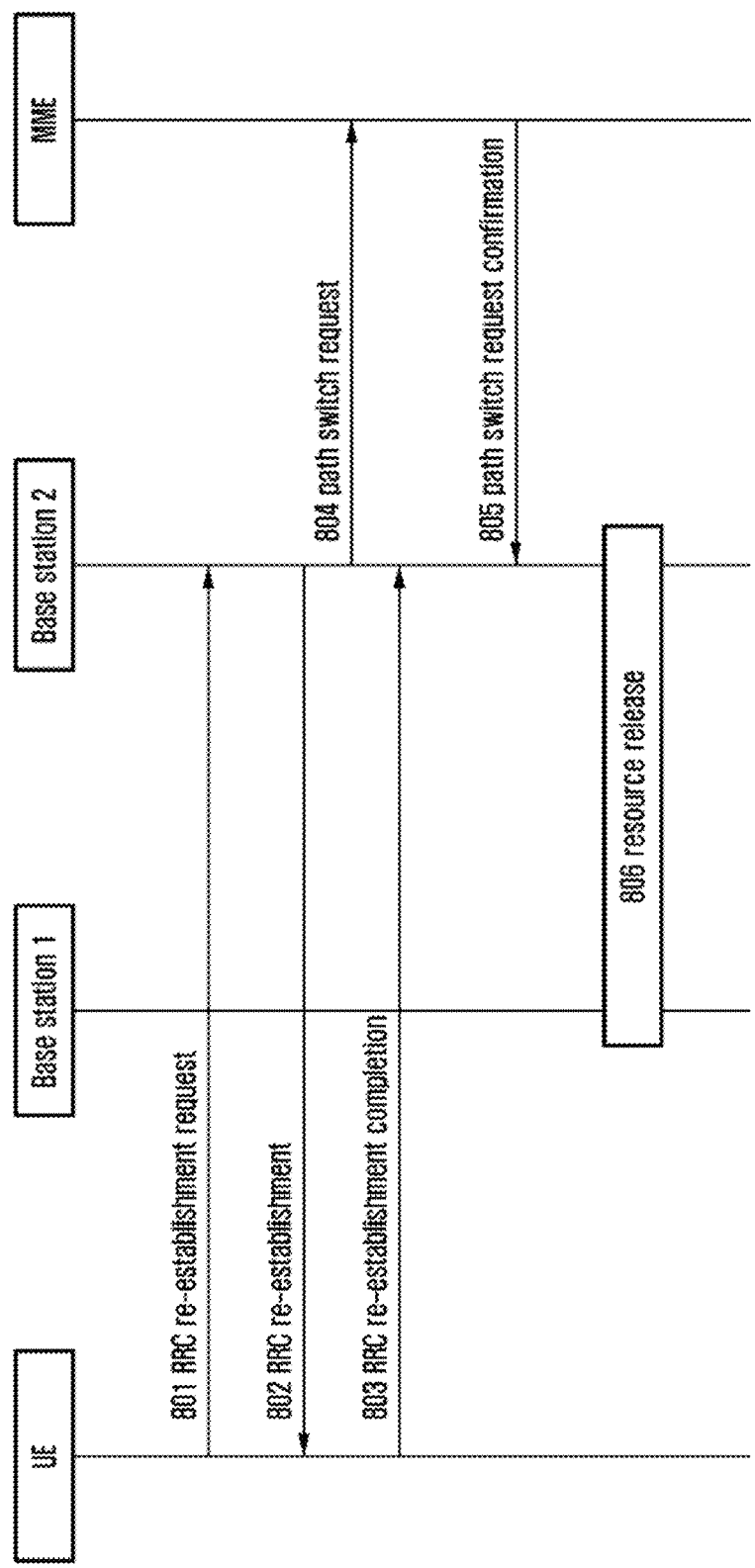
FIG. 8 is a schematic diagram illustrating a method that a base station in a small cell cluster uses saved UE context in accordance with an embodiment of the present disclosure.

It is described in an embodiment in FIG. 8 about how the base station uses the saved UE context specifically.

Figure 5:
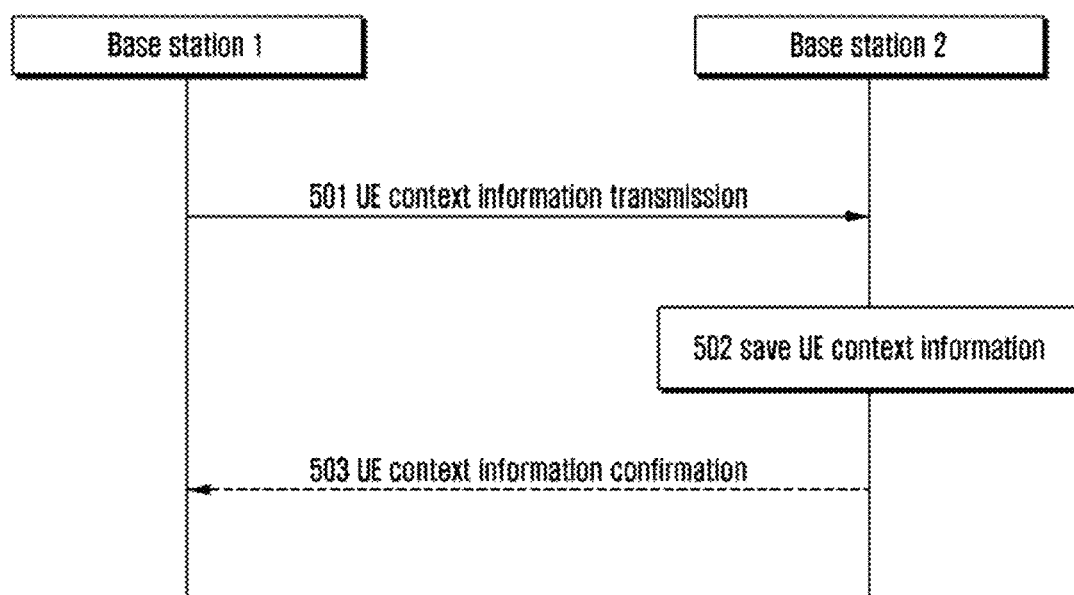
FIG. 5 is a schematic diagram illustrating a process of synchronizing UE context in a small cell cluster in accordance with an embodiment of the present disclosure.

A process that base station 1 transmits UE context to base station 2 is taken as an example, to illustrate the process that base station 1 transmits the UE context to one or more other base stations in the small cell cluster of base station 1. As shown in FIG. 5, the process includes steps as follows:

The process shown in FIG. 5 can occur during the process that a UE is changed from an idle mode to an active mode, alternatively, can occur during the process that the UE accesses base station 1 through handover.

In step 501, base station 1 transmits UE context information to base station 2.

Base station 2 and base station 1 are in a same small cell cluster. Base station 1 can obtain whether base station 2 is in the small cell cluster of base station 1 according to operator configuration (i.e., configuration information). Alternatively, base station 1 can determine base stations of several small cells around the cell according to difference of a cell accessed by the UE. And these base stations are taken as base station 2. The UE context is transmitted to base station 2. Alternatively, base station 1 can determine base stations in a small cell cluster around base station 1 according to a UE measurement report, which are taken as base station 2. The UE context information is transmitted to base station 2. It should be noted that base station 1 determines the base stations included in the small cell cluster according to a measurement report of a current UE. Alternatively, base station 1 determines the base stations included in the small cell cluster according to measurement reports of several UEs in the current cell. Alternatively, base station 1 can determine the base stations included in the small cell cluster of base station 1 according to the operator configuration (i.e., the configuration information). Afterwards, the base stations are filtered according to the measurement report of the UE or measurement reports of a group of UEs. Thus, the base stations in the small cell cluster are determined finally. In a practical application, the base stations in the small cell cluster are determined according to other factors, which is not limited in the present disclosure.

Content included in a transmission message of the UE context information is same as that of step 402, which is not described repeated herein.

In step 502, base station 2 saves the UE context information in the transmission message of the UE context information.

In step 503, base station 2 transmits a UE context information confirmation message to base station 1.

The present disclosure provides two ways that base station 2 responds bases station 1, which includes that base station 2 transmits a response message and base station 2 does not transmit the response message. Thus, step 503 in FIG. 5 is shown as a dotted line.

Base station 1 can transmit UE context information to base station 2 via an X2 interface. Alternatively base station 1 can transmit UE context information to base station 2 via core network through an S1 interface.

Figure 6:
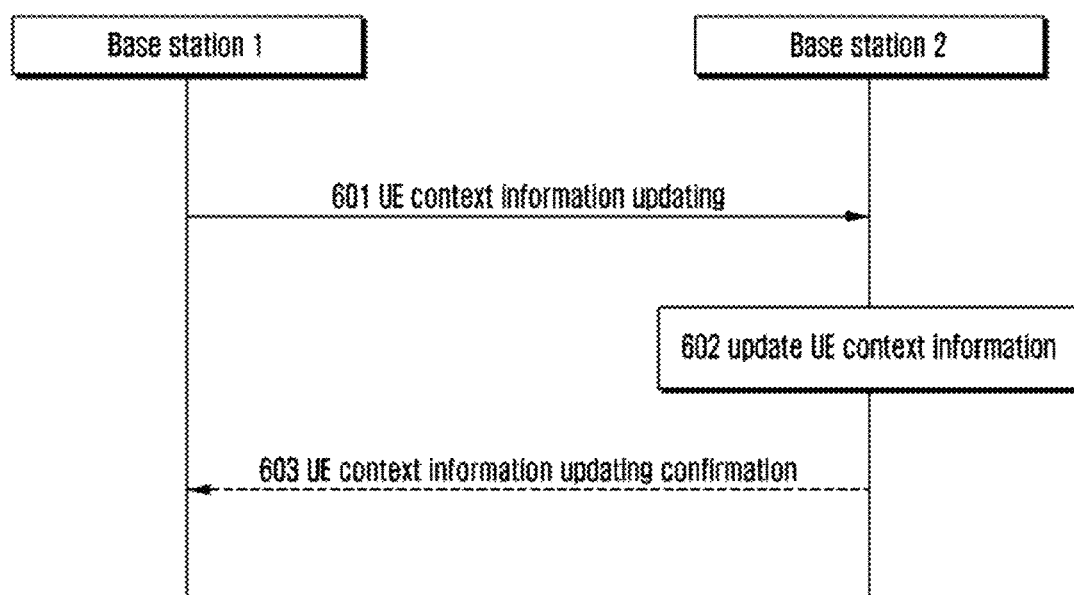
FIG. 6 is a schematic diagram illustrating a process of updating UE context in one or more other base stations in a small cell cluster in accordance with an embodiment of the present disclosure.

When receiving a UE context modification message from a MME, or receiving an ERAB establishment message/an ERAB modification message/an ERAB release message and so on for the UE from the MME, which indicate that the UE context needs to be updated, base station 1 triggers a process of updating the UE context to one or more other base stations in the small cell cluster, as shown in FIG. 6.

In step 601, base station 1 transmits an UE context information updating message to base station 2.

The UE context information updating message includes updated UE context information, also includes a cell identifier of a cell accessed by the UE in base station 1 and an identifier of the UE in the cell accessed by the UE in base station 1. The identifier of the UE in the cell accessed by the UE in base station 1 can be CRNTI. The updated UE context information can include one or more kinds of UE context information described in step 402.

In step 602, base station 2 saves the updated UE context information.

In step 603, base station 2 transmits a confirmation of updating the UE context information to base station 1.

The present disclosure also provides two ways that base station 2 responds to base station 1, which includes base station 2 transmits a response message and base station 2 does not transmit the response message. Thus, step 603 in FIG. 6 is shown as a dotted line.

Base station 1 can transmit UE context information to base station 2 via an X2 interface. Alternatively base station 1 can transmit UE context information to base station 2 via core network through an S1 interface.

Figure 7:
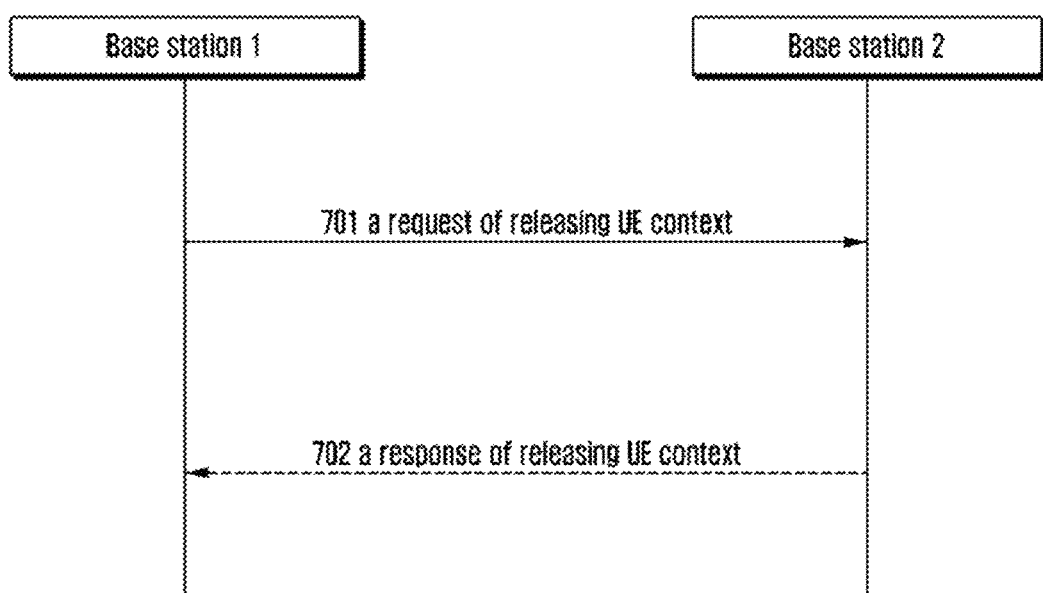
FIG. 7 is a schematic diagram illustrating a process of releasing UE context in one or more other base stations in a small cell cluster in accordance with an embodiment of the present disclosure.

When the UE is changed from an active mode to an idle mode in a cell of base station 1, or the UE moves out of the cell of base station 1, or the UE moves out of the cell of base station 1 and a target cell is not in the small cell cluster of base station 1, base station 1 triggers a process of releasing UE context information to one or more other base stations in the small cell cluster of base station 1, as shown in FIG. 7.

In step 701, base station 1 transmits a request message of releasing the UE context to base station 2. The message includes a cell identifier of a cell accessed by the UE in base station 1 and an identifier of the UE in the cell accessed by the UE in base station 1. The identifier of the UE in the cell accessed by the UE in base station 1 can be CRNTI.

After receiving the request message of releasing the UE context, base station 2 releases the UE context of the corresponding UE.

In step 702, base station 2 transmits a response message of releasing the UE context to base station 1. Herein, the present disclosure also provides two ways that base station 2 responds to base station 1, which includes that base station 2 transmits a response message and base station 2 does not transmit the response message. Thus, step 702 in FIG. 7 is shown as a dotted line.

Base station 1 can transmit UE context release message to base station 2 via an X2 interface. Alternatively base station 1 can transmit UE context release message via core network to base station 2 through an S1 interface.

As described above, a base station in a small cell cluster can save the UE context transmitted by one or more other base stations. A process how a base station saving the UE context uses the saved UE context is illustrated by combination with FIG. 8. As shown in FIG. 8, a process includes steps as follows.

In step 801, when a failure occurs for a UE in base station 1, the UE transmits an RRC connection re-establishment request message to base station 2.

The RRC connection re-establishment request message includes a cell identifier of a cell where the failure occurs for the UE. The cell identifier can be a PCI. The RRC connection re-establishment request message can also include frequency information of the cell where the failure occurs. Alternatively, the cell identifier can be an ECGI. The message can also include an identifier of the UE in a cell where the failure occurs for the UE. The identifier of the UE in the cell where the failure occurs for the UE can be a CRNTI.

In step 802, since base station 2 saves UE security context information, an RRC connection re-establishment succeeds. Base station 2 transmits an RRC re-establishment message to the UE.

In step 803, the UE transmits an RRC re-establishment completion message to base station 2.

In step 804, base station 2 transmits a path switch request message to a MME serving the UE. Herein, base station 2 knows the MME serving the UE according to the UE context information.

Herein, base station 2 sends out messages in steps 802 and 804. There is not an absolute order for these two messages.

In step 805, the MME transmits a path switch request confirmation message to base station 2.

The process of a control plane is described above. A behavior of a user plane is not limited. Some operation ways for the user plane are illustrated as follows, which can further reduce data loss, and guarantee business continuity.

A first way: when receiving a RRC re-establishment request message of step 801, base station 2 assigns an TEID and a transport layer address for uplink and/or downlink data forwarding, and transmits the TEID and the transport layer address to base station 1.

For the downlink data forwarding, when determining the downlink data forwarding, base station 2 assigns the TEID and the transport layer address for the downlink data forwarding, and transmits them to base station 1. For the uplink data forwarding, when requesting the uplink data forwarding, base station 2 assigns the TEID and the transport layer address for the uplink data forwarding, and transmits them to base station 1. Base station 1 determines whether to accept the uplink data forwarding. Base station 2 transmits a cell identifier of a source cell of the UE (a serving cell when the UE is in base station 1), an identifier of the UE in the source cell to base station 1. Base station 1 starts to forward data of the UE to base station 2 according to the cell identifier and the identifier of the UE in the cell, which are received from base station 2, and user plane of the data forwarding assigned by base station 2. Base station 1 transmits data transmission context to base station 2. The data transmission context includes a PDCP SN and a HFN. A downlink PDCP SN indicates a SN needed to be used for a next PDCP SDU. An uplink PDCP SN indicates a SN of a first lost PDCP SDU. The data transmission context can also include a reception state of an uplink PDCP SDU. Base station 2 can only request data forwarding carried by an acknowledge mode (AM) of a Radio link control protocol (RLC). In order to guarantee data transmission in order, base station 2 can transmit the data received from base station 1 firstly, and then transmit the data received from a core network for the UE.

A second way: according to a measurement report of a UE, at the same time of transmitting downlink data to the UE, data is also transmitted to a neighbor base station of which a signal quality is good in a small cell cluster. And corresponding data transmission context is also transmitted. When the UE has a re-establishment in base station 2, base station 2 starts to transmit the downlink data to the UE according to the data transmission context received from base station 1, and transmit the corresponding uplink data packet to a core network.

A third way: a core network transmits data to some base stations in a small cell cluster at the same time. Thus, base station 2 receives the data from the core network, synchronously with base station 1.

According to a process shown in FIG. 8, it is guaranteed that a RRC connection re-establishment of a UE successes, so that the UE does not return to an idle mode and data loss is reduced, user experience is improved.

The present disclosure provides some methods to make two base stations exchange information of small cell cluster of the two base stations respectively. The methods are respectively illustrated in detail as follows.

Figure 9:
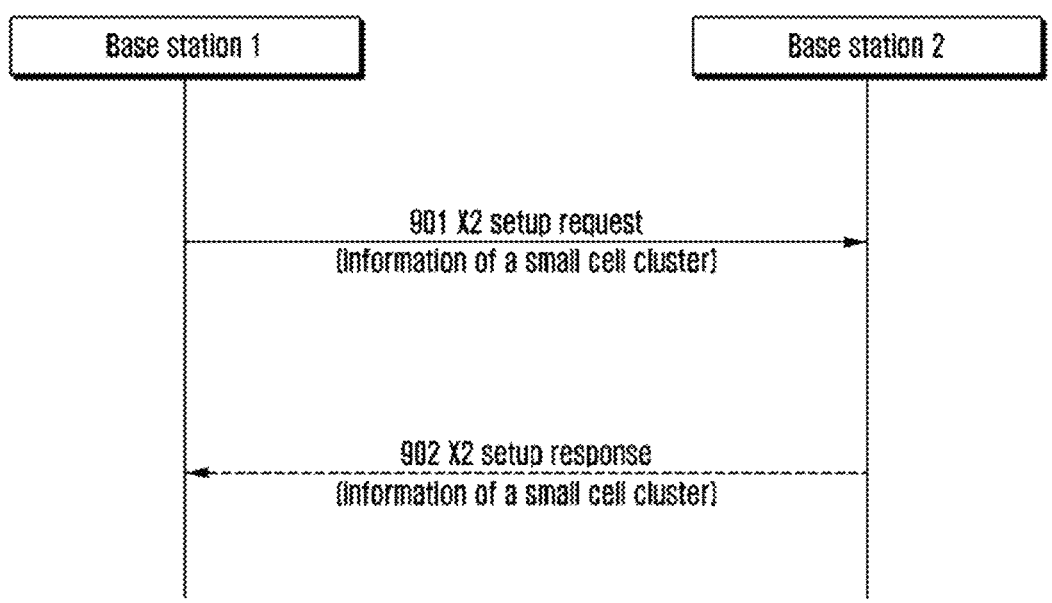
FIG. 9 is a schematic diagram illustrating a process of exchanging information of small cell clusters between two base stations in accordance with an embodiment of the present disclosure.

FIG. 9 is a schematic diagram illustrating a first method for exchanging small cell cluster information between two base stations. The method includes:

In step 901, base station 1 transmits an X2 setup request message to base station 2. The X2 setup request message includes information of a small cell cluster of base station 1.

The information of the small cell cluster includes a list of base stations in the small cell cluster of base station 1. The list of the base stations can be a list of base station identifiers, or a list of base station IP addresses, or a list of other information which can identify the base stations. The information of the small cell cluster can be a small cell cluster identifier. Base station 2 saves the received information.

In step 902, base station 2 transmits an X2 setup response message to base station 1. The X2 setup response message includes information of a small cell cluster of base station 2.

The information of the small cell cluster includes a list of base stations in the small cell cluster of base station 2. The list of the base stations can be a list of base station identifiers, or a list of base station IP addresses, or a list of other information which can identify the base stations. The information of the small cell cluster can be a small cell cluster identifier. Base station 1 saves the received information.

A second method for exchanging small cell cluster information between two base stations is that:

When there is no an X2 interface between base station 1 and base station 2, the small cell cluster information in a method as shown in FIG. 9 is transmitted through a core network between base station 1 and base station 2, i.e., through an S1 interface.

A third method for exchanging small cell cluster information between two base stations is described hereinafter.

A cell in base station 2 broadcasts information of a small cell cluster. The information of the small cell cluster is same as that described in step 902. A UE accesses a cell in base station 1, reads broadcast information of the cell in base station 2, obtains the information of the small cell cluster of base station 2, and transmits the information of the small cell cluster of base station 2 to base station 1. Through a similar process, base station 2 can obtain information of a small cell cluster of base station 1.

A small cell cluster of base station 1 (cluster1) and a small cell cluster of base station 2 (cluster2) can be different. That is, one or more base stations included in the small cell cluster of base station 1 can be not exactly same as one or more base stations included in the small cell cluster of base station 2. Through the three methods above, base station 1 and base station 2 have already respectively obtained information of small cell clusters of correspondent base stations. When the UE is handed over from base station 1 to base station 2, base station 2 is needed to synchronize the UE context to a base station in cluster2 and release the UE context in a base station not in cluster2. During a process of handing over the UE from base station 1 to base station 2, base station 1 is a source base station of handover, base station 2 is a target base station of the handover. A small cell cluster of the source base station is referred to as a source small cell cluster, i.e., cluster1 hereinafter. A small cell cluster of the target base station is referred to as a target small cell cluster, i.e., cluster2 hereinafter. The present disclosure provides three ways for synchronizing the UE context.

A first synchronization way: base station 2 synchronizes UE context to one or more other base stations in cluster2, i.e., base station 2 performs a process as shown in FIG. 5 for a base stations in cluster2. Base station 1 releases the UE context in a base station in cluster1, i.e., base station 1 performs a process as shown in FIG. 7 for the base station in cluster1.

A second synchronization way: for a base station in both cluster1 and cluster2, base station 2 performs a process as shown in FIG. 6, transmits updated UE context to the base station. Corresponded with this method, during a process of handover preparation, a source base station (e.g., base station 1) transmits an identifier of a cell where a UE locates in base station1 and an identifier of the UE in the cell of base station 1 to a target base station (e.g., base station 2). A message of requesting to update UE context from base station 2 includes the identifier of the cell and the identifier of the UE. Thus, the base station in both cluster1 and cluster2 can update the corresponding UE context according to a request of base station 2.

For a base station in cluster2 but not in cluster1, base station 2 performs a process as shown in FIG. 5 to transmit the UE context information to the base station. For a base station in cluster1 but not in cluster2, base station 1 performs a process as shown in FIG. 7 to release the UE context in the base station.

A third synchronization way: for a base station in both cluster1 and cluster2, base station 2 performs a process as shown in FIG. 6 to transmit UE context updating to the base station. Corresponded to this method, during a process of handover preparation, a source base station (e.g., base station 1) transmits an identifier of a cell where a UE locates in base station1 and an identifier of the UE in the cell of base station 1 to a target base station (e.g., base station 2). A request message of the UE context updating from base station 2 includes the identifier of the cell and the identifier of the UE. Thus, the base station in both cluster1 and cluster2 can update the corresponding UE context according to a request of base station 2. For a base station in cluster2 but not in cluster1, base station 2 performs a process as shown in FIG. 5 to transmit UE context information to the base station. For a base station in cluster1 but not in cluster2, base station 2 performs a process as shown in FIG. 7 to release UE context of the UE in the base station. Corresponded to this method, during the process of the handover preparation, the source base station (e.g., base station 1) transmits the identifier of the cell where a UE locates in base station 1 and the identifier of the UE in the cell of base station 1 to the target base station (e.g., base station 2). The request message of the UE context updating from base station 2 includes the identifier of the cell and the identifier of UE. Thus, the base station in both cluster1 and cluster2 can update the corresponding UE context according to the request of base station 2.

In addition to the aforementioned methods, small cell cluster information can be exchanged between two base stations during an X2 handover process or an S1 handover process, which are respectively instructed as follows by combination with FIG. 10 and FIG. 11.

Figure 10:
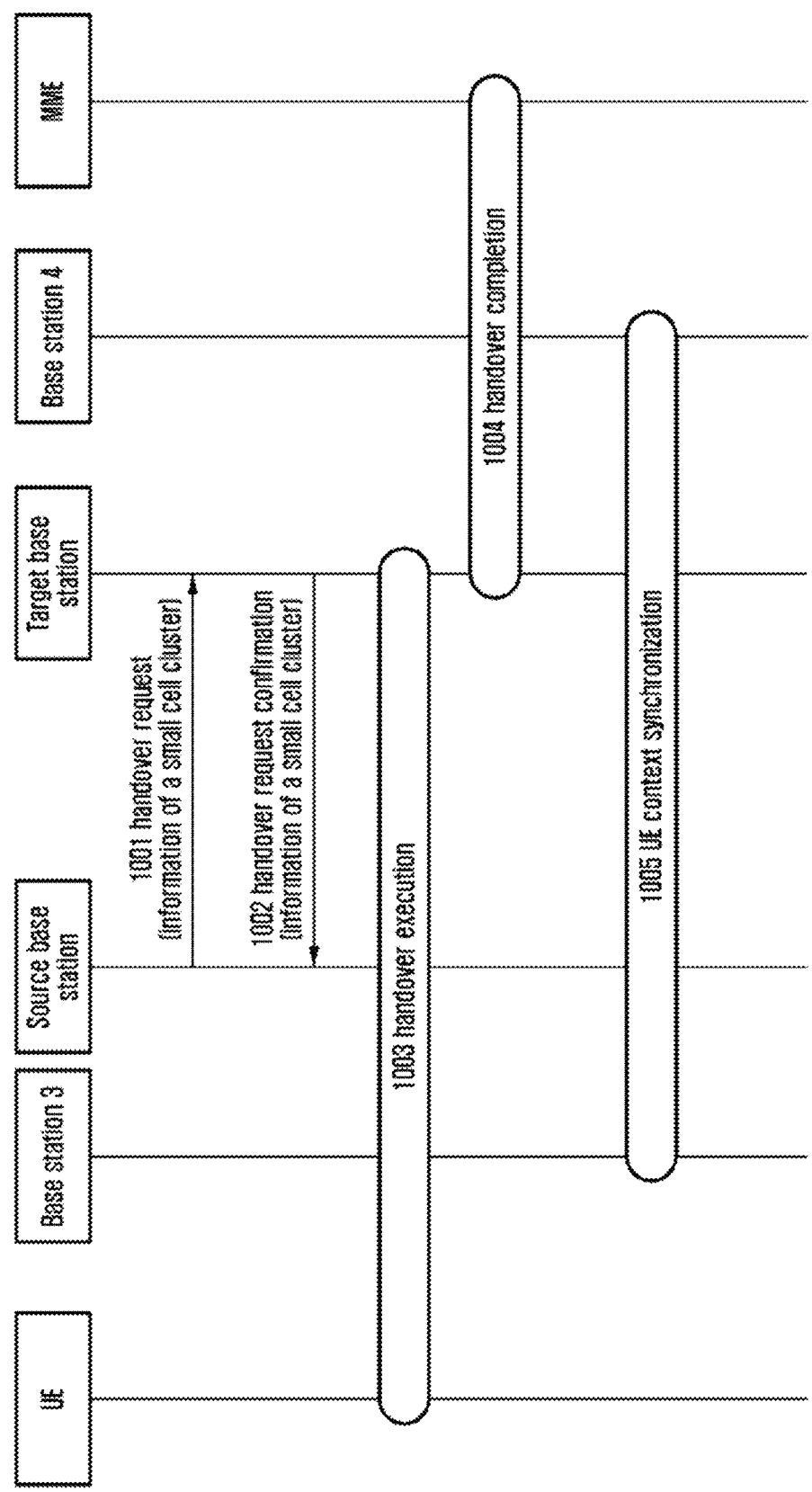
FIG. 10 is a schematic diagram illustrating a process of exchanging information of small cell clusters between two base stations during a process of X2 handover in accordance with an embodiment of the present disclosure.

FIG. 10 is a method for exchanging information of small cell clusters between two base stations in a process of handing over a UE from a source base station to a target base station through X2 handover in accordance with an embodiment of the present disclosure. The process includes steps as follows.

In step 1001, the source base station transmits a handover request message to the target base station. The message includes the information of a small cell cluster of the source base station. Content included in the information of the small cell cluster is same as that of step 901, which is not described repeatedly herein.

In step 1002, the target base station transmits a handover request confirmation message to the source base station.

Optionally, the message can include the information of a small cell cluster of the target base station. Content included in the information of the small cell cluster is same as that of step 902, which is not described repeatedly herein.

In step 1003, a current handover execution process is performed.

In step 1004, a current handover completion process is performed.

In step 1005, a process of synchronizing UE context in a new small cell cluster is performed. The target base station and the source base station synchronize the UE context information in one or more other base stations according to the information of small cell clusters exchanged in step 1001 and/or step 1002. A specific synchronization way is same as description above, which is not described repeatedly herein.

It should be noted that a process of synchronizing the UE context in step 1005 can be in accordance with the information exchanged in step 1001 and step 1002, which is performed as soon as handover completion. Alternatively, the information of the small cell cluster of base station 2 may be not included in step 1002. After the handover completion, base station 2 re-executes a measurement process for the UE. The information of the small cell cluster of base station 2 is obtained in accordance with the measurement of the UE. Afterwards, the process of synchronizing the UE context is performed. When the process of synchronizing the UE context needs participation of base station 1, after obtaining the information of the small cell cluster of base station 2, base station 2 can transmits a message to base station 1 to notify the information of the small cell cluster of base station 2 to base station 1.

Figure 11:
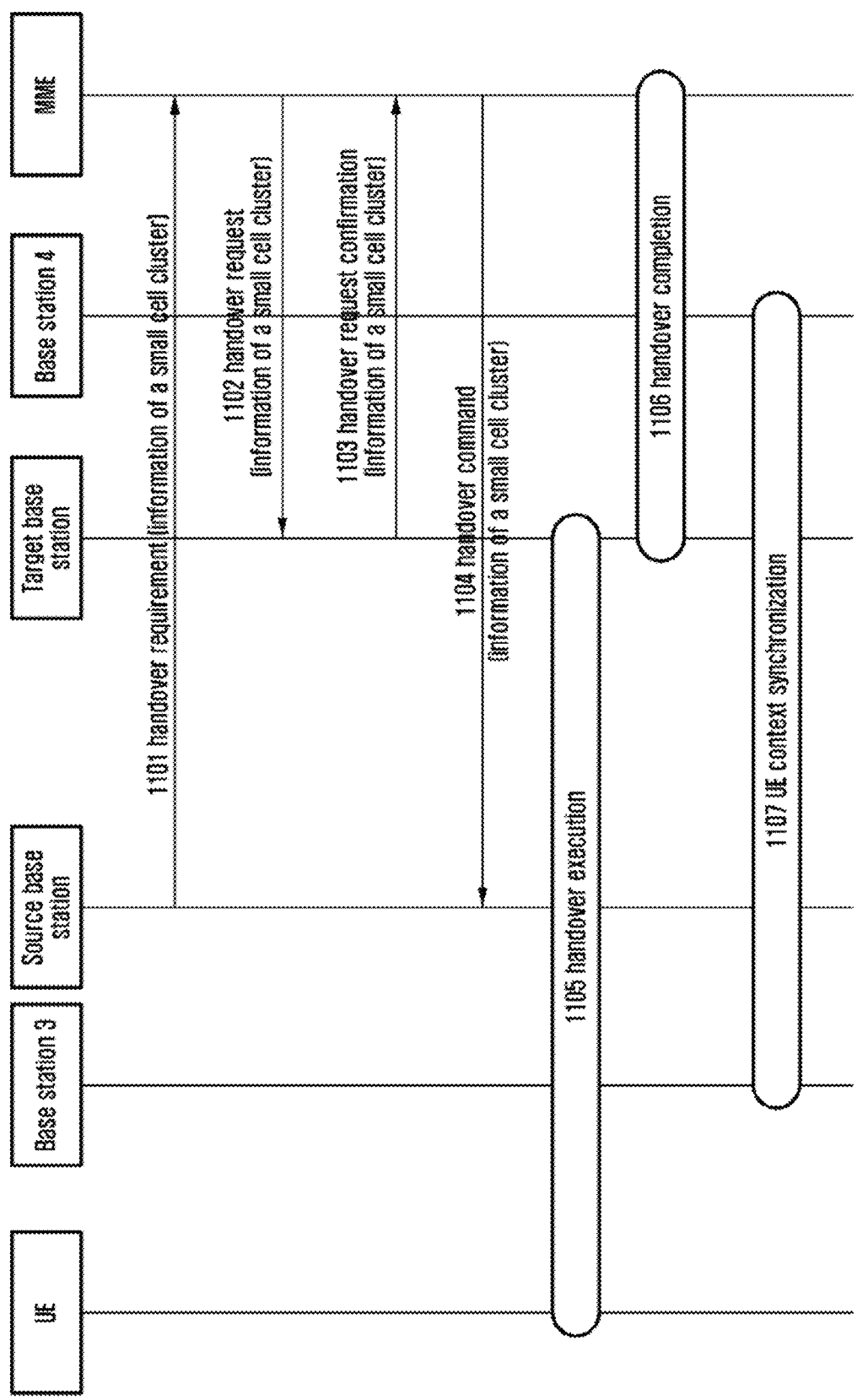
FIG. 11 is a schematic diagram illustrating a process of exchanging information of small cell clusters between two base stations during a process of S1 handover in accordance with an embodiment of the present disclosure.

FIG. 11 is a method for exchanging information of small cell clusters between two base stations during a process that a UE is handed over from a source base station to a target base station through S1 handover, which includes steps as follows:

In step 1101, the source base station transmits a handover requirement message to a MIME. The message includes the information of a small cell cluster of the source base station. Content included in the information of the small cell cluster is same as that of step 901, which is not described repeatedly herein. The information of the small cell cluster can be included in a transparent container from the source base station to the target base station.

In step 1102, the MME transmits the handover request message to the target base station. The message includes the information of the small cell cluster of the source base station. The content included in the information of the small cell cluster is same as that of step 901, which is not described repeatedly herein. The information of the small cell cluster can be included in the transparent container from the source base station to the target base station.

In step 1103, the target base station transmits a handover request confirmation message to the MME.

Optionally, the message can include the information of the small cell cluster of the target base station. The content included in the information of the small cell cluster is same as that of step 902, which is not described repeatedly herein. The information of the small cell cluster can be included in the transparent container from the target base station to the source base station.

In step 1104, the MME transmits a handover command message to the source base station.

When the handover request confirmation message in step 1103 includes the information of the small cell cluster of the target base station, the handover command message in this step also includes the information of the small cell cluster of the target base station. The content of the small cell cluster is same as that of step 902, which is not described repeatedly herein. The information of the small cell cluster can be included in the transparent container from the target base station to the source base station.

In step 1105, a process of handover execution is performed.

In step 1106, a process of handover completion is performed.

In step 1107, a process of synchronizing UE context in a new small cell cluster is performed. The target base station and the source base station synchronize the UE context according to small cell cluster exchanged in step 1101 and step 1102, and/or step 1103 and step 1104. A specific synchronization way is described as above, which is not described repeatedly herein.

It should be noted that a process of synchronizing the UE context in step 1107 can be in accordance with the information exchanged from steps 1101 to 1104, which is performed as soon as handover completion. Alternatively, the information of the small cell cluster of base station 2 may be not included in steps 1103 and 1104. After the handover completion, base station 2 re-executes a measurement process for the UE. The information of the small cell cluster of base station 2 is obtained in accordance with the measurement of the UE. Afterwards, the process of synchronizing the UE context is performed. When the process of synchronizing the UE context needs participation of base station 1, after obtaining the information of the small cell cluster of base station 2, base station 2 can transmits the information to base station 1 to notify the information of the small cell cluster of base station 2 to base station 1. The message can be an X2 interface message, alternatively can be an S1 interface message.

Figure 12:
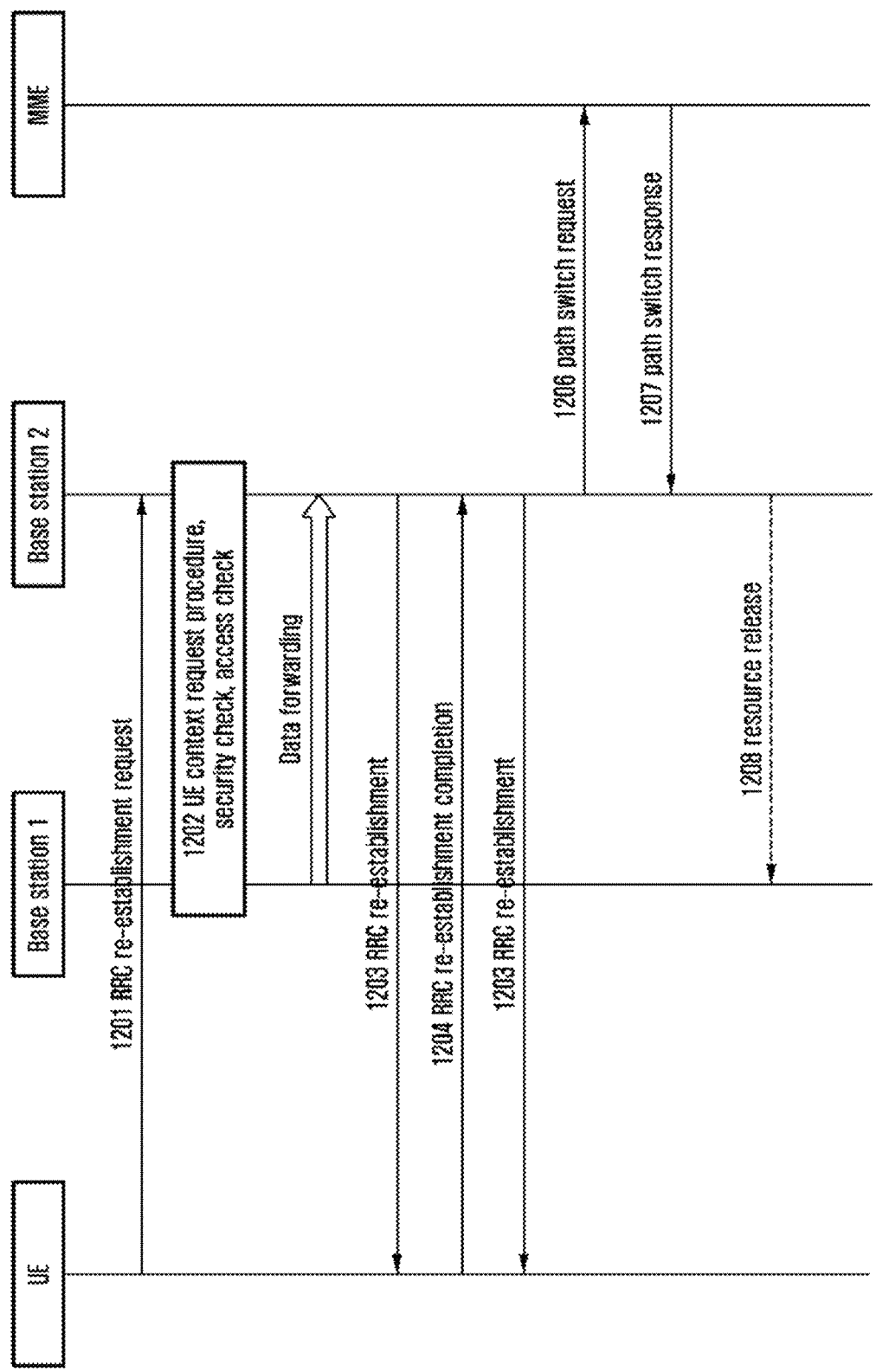
FIG. 12 is a schematic diagram illustrating a second method for supporting UE fast recovery in accordance with an embodiment of the present disclosure.

A first method for supporting UE fast recovery is described specifically in accordance with embodiments of the present disclosure. As shown in FIG. 12, a second method for supporting UE fast recovery is described specifically as follows in accordance with embodiments of the present disclosure. The method shown in FIG. 12 includes steps as follows.

In step 1201, when a failure occurs for a UE in base station 1, the UE performs cell reselection, e.g., selecting cell 2 of base station 2, and transmits a RRC re-establishment request message to base station 2.

The RRC re-establishment request message includes a cell identifier of a cell where the failure occurs for the UE. The cell identifier can be a PCI. The RRC re-establishment message can also include frequency information of the cell where the failure occurs. The cell identifier can an ECGI alternatively. The message can also include an identifier of the UE in the cell where the failure occurs for the UE. The identifier of the UE in the cell where the failure occurs for the UE can be a CRNTI. The RRC connection re-establishment request message can also include a TAI of the cell where the failure occurs.

In step 1202, base station 2 obtains UE context from base station 1. The base station 1 or base station 2 can perform access check for the UE. Base station 1 can also perform security check for the UE. In particular, there are four methods that base station 2 obtains the UE context from base station 1 and base station 1 or base station 2 performs the access check respectively as shown in FIG. 13, FIG. 14, FIG. 15 and FIG. 16. It is also introduced in FIG. 13, FIG. 14, FIG. 15 and FIG. 16 that base station 1 performs the security check for the UE.

Afterwards, base station 1 stops transmitting downlink data for the UE, and forwards the data to base station 2.

Figure 13:
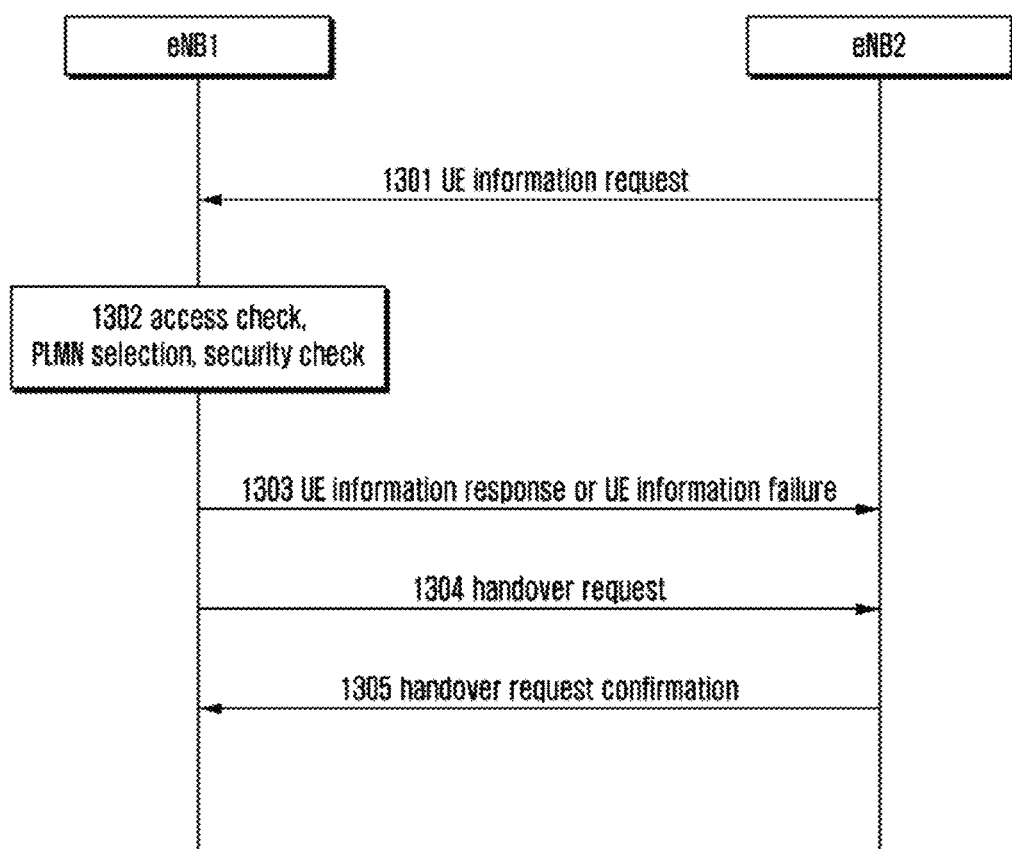
FIG. 13 is a schematic diagram illustrating a first method that a base station obtains UE context from another base station.

The first method is shown in FIG. 13, which includes the following steps. Base station 2 transmits a UE information request message to base station 1 to request UE context information. The message includes the cell identifier of the cell (the cell in base station 1) where the failure occurs for the UE. The cell identifier can be the PCI. The message can also include frequency information of the cell where the failure occurs. The cell identifier can include the ECGI alternatively, or include the PCI and the ECGI at the same time. The message also includes the identifier of the UE in the cell where the failure occurs for the UE. The identifier of the UE in the cell where the failure occurs for the UE can be the CRNTI. The identifier of the UE in the cell where the failure occurs for the UE can be an eNB X2 AP ID of the UE in the source base station alternatively. The message can also include a short Media Access Control (MAC) identifier (shortMACI).

The message also includes the cell identifier PCI and/or ECGI of a re-establishment cell. The message also includes eNB X2 AP ID assigned in an interface between eNB1 and eNB2 for the UE by eNB2.

In step 1302, base station 1 performs security check, access check for the UE, and performs PLMN selection.

A method that base station 1 performs the security check for the UE includes that: performing the security check for the UE by use of the PCI or the ECGI of the cell where the failure occurs and obtained from step 1301, CRNTI of the UE in the cell where the failure occurs and the shortMACI. Base station 1 finds the cell where the failure occurs according to the PCI of the cell where the failure occurs. In order to avoid PCI confusion, base station 1 can find the cell where the failure occurs according to the ECGI of the cell where the failure occurs or PCI and frequency information of the cell where the failure occurs. Base station 1 finds the UE context according to CRNTI of the UE in the cell where the failure occurs. Base station 1 computes the shortMACI according to cell identifier PCI of the re-establishment cell and security context in the UE context. If the shortMACI computed and the shortMACI received from base station 1 are same, the UE passes the security check. Otherwise, the UE does not pass the security check. eNB1 transmits UE information failure to eNB2 in step 1303.

A method that base station 1 performs the access check for the UE includes: performing the access check for the UE according to the cell identifier of the re-establishment cell and UE handover restriction list (HRL). Base station 1 determines whether PLMN IDs broadcasted in the re-establishment cell includes a registered PLMN (rPLMN) ID or an equivalent PLMN (ePLMN) ID of the UE, determines whether the re-establishment cell is not in a tracking area (TA) prohibited for the UE and determines whether the re-establishment cell is not in a radio access technology (RAT) prohibited for the UE. Base station 1 can obtain the cell identifier of the cells in base station 2, a TAC supported by the cells in base station 2 and a PLMN ID list of the cells in base station 2 through X2 setup procedure. Afterwards, base station 1 knows a PLMN ID list broadcasted by the reestablish cell in base station 2 and the TA (TAC or TAI) where the reestablish cell in base station 2 locates according to the PCI or the ECGI of the reestablish cell in base station 2 received in step 1301 and information obtained during X2 setup. The message in step 1301 can include the TA (TAC or TAI) of the re-establishment cell and the broadcasted PLMN ID list. If the PLMN IDs broadcasted by the re-establishment cell does not include the rPLMN or the ePLMN of the UE, or the re-establishment cell is included in a prohibited TA, or the re-establishment cell is included in a prohibited RAT for the UE, the access check fails. Otherwise, the access check successes. Base station 1 knows the RAT to which the re-establishment cell belongs according to frequency of the re-establishment cell or configuration. If the access check fails, eNB1 transmits UE information failure to eNB2 in step 1303. In the condition that the access check successes, base station 1 selects a serving PLMN in one or more PLMNs broadcasted by the re-establishment cell and the PLMN ID is rPLMN ID or ePLMN ID of the UE. Base station 1 takes the newly-selected PLMN as the rPLMN, and takes the previous rPLMN and other ePLMNs as ePLMNs that are put in a HRL. The new HRL is transmitted to base station 2 in step 1304.

In step 1303, according to a result of the security check and a result of the access check in step 1302, in the condition that both the security check and the access check succeed, eNB1 transmits a UE information response to eNB2, in the condition that either the security check or the access check fails, eNB1 transmits a UE information failure to base station 2.

The UE information response or the UE information failure includes an eNB UE S1 AP assigned for the UE by eNB2. The UE information response can also include an eNB UE X2 AP assigned for the UE by eNB1. The UE information failure can also include a failure reason, e.g., a malicious UE or prohibited access.

In another method, in the condition that both the security check and the access check success, eNB1 can transmit a message in step 1304 directly. In the condition that check fails, eNB1 does not transmit the message to eNB2. eNB2 knows that the UE information request fails according to an implementation way such as a timer. Thus, a RRC re-establishment reject message is transmitted to the UE in step 1203.

In step 1304, eNB1 transmits a handover request message to eNB2. The message can include eNB UE X2 AP ID assigned for the UE by eNB2. An identifier of a target cell in the handover request message is the ECGI of the re-establishment cell received from base station 2 in step 1301. The security information in the handover request message is computed according to the PCI and the frequency of the re-establishment cell. eNB1 can obtain the frequency of the re-establishment cell during the process of establishing X2 between eNB1 and eNB2. Alternatively, the frequency of the re-establishment cell can be included in step 1301.

In step 1305, eNB2 transmits a handover request confirmation message to eNB1.

In a re-establishment scenario, the handover request confirmation message may not include a transparent container from a target base station to a source base station.

Steps 1305 and 1203 are transmitted by eNB2. There are no absolute order between steps 1305 and 1203, which is not limited in the present disclosure.

It should be noted that, in the condition that there is no X2 interface between base station 2 and base station 1, the messages of steps 1301-1305 can be transmitted via a S1 interface. When base station 2 transmits the UE information request to base station 1 in the S1 interface via an MME, the UE information request includes the TAI and the ECGI of the cell where the failure occurs received from the UE in step 1201. TAI is used for routing among core networks and finding the MME with which base station 1 connects. The MME connected with base station 1 finds base station 1 by use of the ECGI of the cell where the failure occurs.

Figure 14:
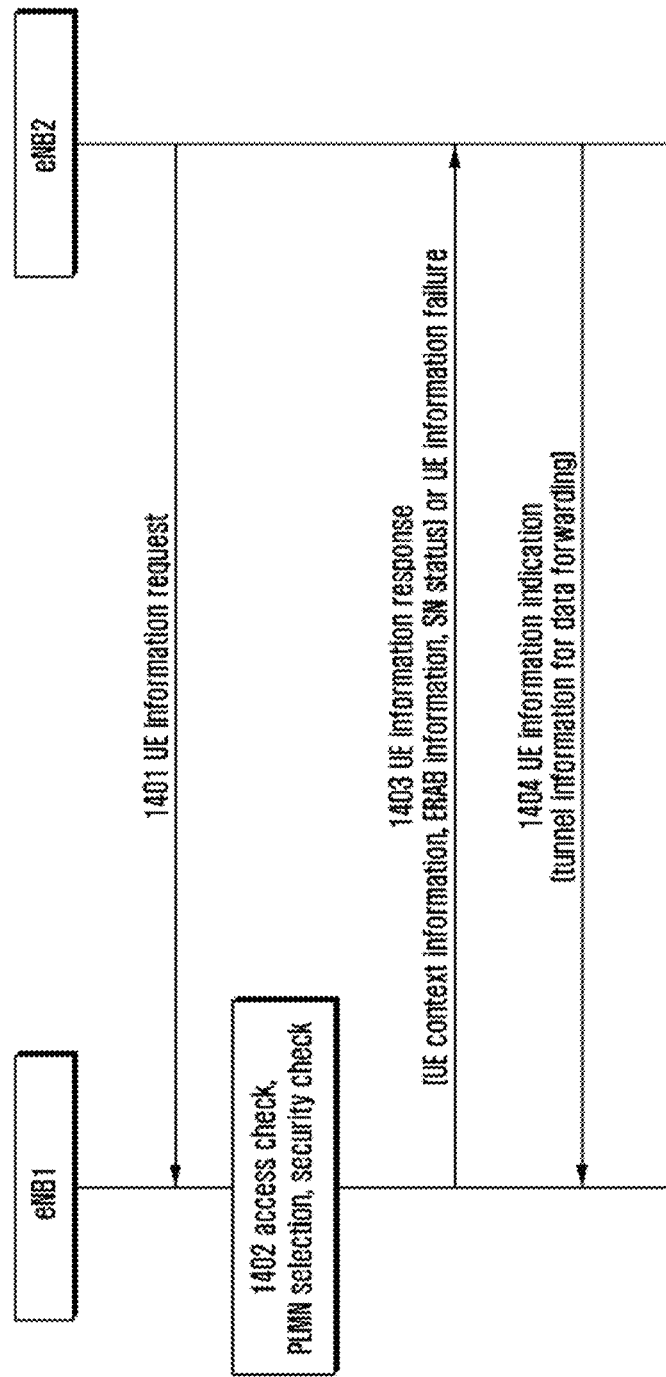
FIG. 14 is a schematic diagram illustrating a second method that a base station obtains UE context from another base station.

A second method is as shown in FIG. 14, which in detail includes the following steps.

Steps 1401 and 1402 are respectively the same as steps 1301 and 1302, which is not described repeatedly herein. It should be noted that, in the condition that either the access check or the security check fails in step 1402, base station 1 transmits the UE information failure to base station 2 in step 1403.

In step 1403, according to a result of security check and a result of access check in step 1402, in the condition that both the security check and the access check success, eNB1 transmits a UE information response to eNB2. In the condition that either the security check or the access check fails, eNB1 transmits a UE information failure to base station 2.

The UE information failure includes eNB UE S1 AP ID assigned for the UE by eNB2. The UE information failure can also include a failure reason, e.g., a malicious UE or prohibited access.

The UE information response includes eNB UE S1 AP ID assigned for the UE by eNB2. The UE information response can also include eNB UE X2 AP ID assigned for the UE by eNB1.

The UE information response message includes the UE context information. The UE context information includes one or more kinds of information as follows: UE security context, ERAB information, Source MME information, an identifier of a UE in a source MME, UE capability, a handover limitation list, and UE history information.

The ERAB information includes an ERAB identifier, ERAB QoS information, an ERAB uplink GTP TED, whether downlink data forwarding is needed.

The UE context can also include the cell identifier of the cell where a failure occurs for the UE in base station 1. The cell identifier can be the PCI. The UE context can also include frequency information of the cell where the failure occurs. The cell identifier can be the ECGI alternatively. The UE context also includes the identifier of the UE in the cell where the failure occurs for the UE in base station 1. The identifier of the UE can be the CRNTI or eNB X2 AP ID of the UE in the source base station. The UE context information can also include other UE context information, which is not limited in the present disclosure.

The UE context information also includes SN status information. The SN status information includes a PDCP SN and HFN status information. In detail, the SN status information includes receiving status of an uplink PDCP SDU of the ERAB that data forwarding is needed and a COUNT value of uplink and downlink. The COUNT value refers to the PDCP SN and HFN information. A downlink PDCP SN indicates an SN needed to be used for a next PDCP SDU. An uplink PDCP SN indicates a SN of a first lost PDCP SDU. Base station 2 can only request uplink data forwarding carried through a RLC acknowledge mode (AM). In order to ensure data transmission in order, base station 2 can transmits the data received from base station 1 to the UE firstly, and then transmits the data received from the core network to the UE. Base station 1 can transmit the SN status information to base station 2 through the UE information response message, alternatively transmit it through another separate message.

Base station 1 stops transmitting downlink data to the UE.

In step 1404, base station 2 allocates resource for the REAB. Base station 2 transmits a UE information indication to base station 1. The UE information indication can be a confirmation message of step 1403, can also be an independent indication message. The message includes eNB UE X2 AP ID assigned by eNB1 and eNB2.

The message can also include an accepted ERAB list. The accepted ERAB list includes a downlink and/or uplink GTP TED for data forwarding. The message can also include an ERAB list not accepted.

After receiving the message, base station 1 can start forwarding data to base station 2.

Steps 1404 and 1203 are transmitted by base station 2. There is no absolute order between 1404 and 1203, which is not limited in the present disclosure.

It should be noted that, in the condition that there is no X2 interface between base station 2 and base station 1, the messages of steps 1401-1404 can be transmitted via a S1 interface. When base station 2 transmits the UE information request to base station 1 in the S1 interface via an MME, the UE information request includes the TAI and the ECGI of the cell where the failure occurs received from the UE in step 1201. TAI is used for routing among core networks and finding the MME with which base station 1 connects. The MME connected with base station 1 finds base station 1 by use of the ECGI of the cell where the failure occurs.

Figure 15:
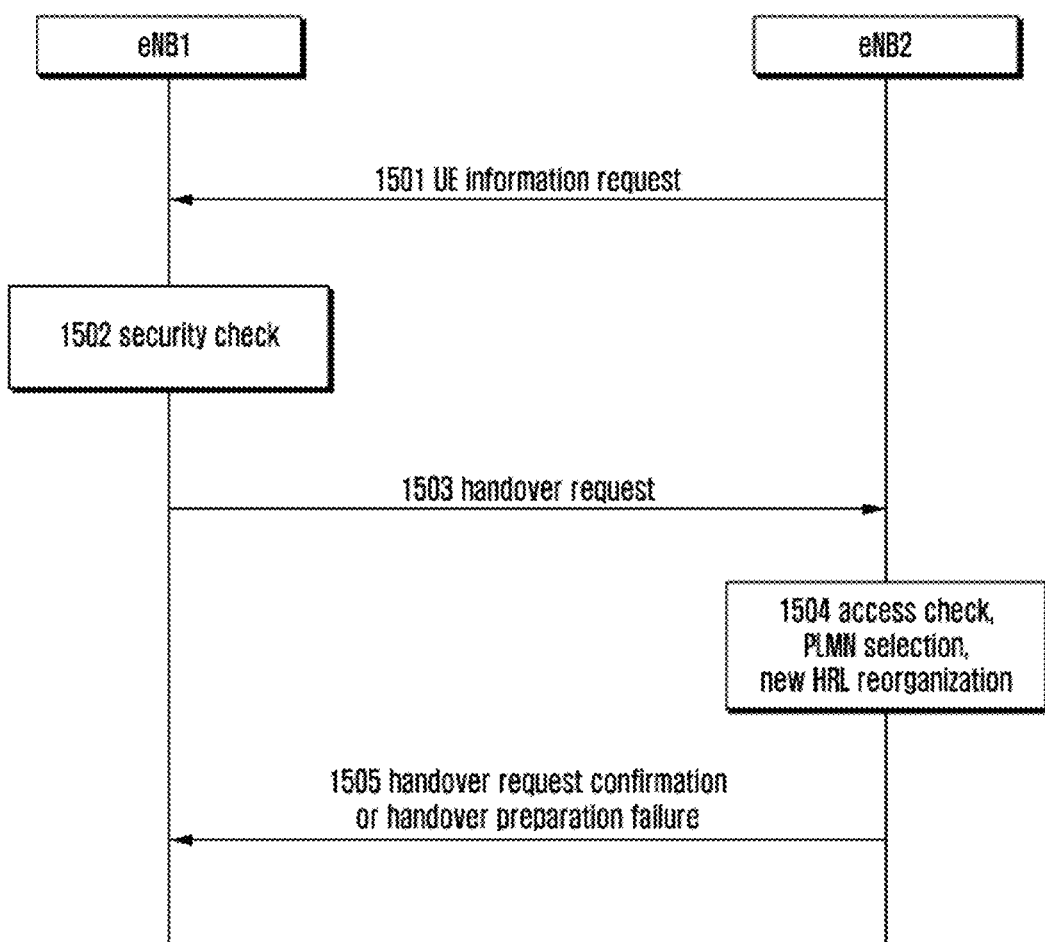
FIG. 15 is a schematic diagram illustrating a third method that a base station obtains UE context from another base station.

A third method is as shown in FIG. 15, which includes the following steps.

Step 1501 is the same as step 1301, which is not described repeatedly herein.

In step 1502, base station 1 performs security check for the UE. Base station 1 performs the security check for the UE by use of the PCI or the ECGI of the cell where the failure occurs and obtained from step 1501, the CRNTI of the UE in the cell where the failure occurs, the shortMACI. Base station 1 finds the cell where the failure occurs according to the PCI of the cell where the failure occurs. In order to avoid PCI confusion, base station 1 finds the cell where the failure occurs according to the ECGI of the cell where the failure occurs or PCI and frequency information of the cell where the failure occurs received in step 1501. Base station 1 finds the UE context according to the CRNTI of the UE in the cell where the failure occurs. Base station 1 computes the shortMACI according to cell identifier PCI of the re-establishment cell and security context in the UE context. If the shortMACI computed and the shortMACI received from base station 1 are same, the UE passes the security check. Otherwise, the UE does not pass the security check.

In the condition that the security check successes, base station 1 transmits a handover request message to base station 2 in step 1503.

In the condition that security check fails, base station 1 does not transmit the message in step 1503. eNB2 knows that the UE information request fails according to an implementation way, e.g., a timer mechanism. Thus, a RRC re-establishment reject message is transmitted to the UE in step 1203.

In another method, the security check can also be performed after base station 2 receives the handover request message in step 1504. Thus, this step can be skipped. Corresponding to this way, the handover request message in step 1503 can include the security context of the UE in the cell where the failure occurs. Base station 2 computes the shortMACI according to cell identifier PCI of the re-establishment cell and the security context in the UE context received from base station 1. If the shortMACI computed and the shortMACI received from the UE in step 1201 are same, the UE passes the security check. Otherwise, the UE does not pass the security check. Base station 2 transmits RRC Re-establishment reject to UE in step 1203.

In step 1503, eNB1 transmits the handover request message to eNB2. The message can include eNB UE X2 AP ID assigned for the UE by eNB2. An identifier of a target cell in the handover request message is the ECGI of the re-establishment cell received from base station 2 in step 1301. The security information in the handover request message is computed according to the PCI and the frequency of the re-establishment cell. eNB1 can obtain the frequency of the re-establishment cell during the process of establishing X2 between eNB1 and eNB2. Alternatively, the frequency of the re-establishment cell can be included in step 1301.

Base station 1 transmits HRL information of the UE to base station 2.

In step 1504, base station 2 performs access check for the UE. Base station 2 performs the access check according to a cell identifier of the re-establishment cell and HRL of the UE. Base station 2 determines whether the PLMN IDs broadcasted by the re-establishment cell includes an rPLMN ID or an ePLMN ID of the UE, whether the re-establishment cell is not included in the prohibited TA, and whether the re-establishment cell is not included in the prohibited RAT. If the PLMN IDs broadcasted by the re-establishment cell doesn't include the rPLMN ID or the ePLMN ID of the UE, or the re-establishment cell is included in the prohibited TA, or the re-establishment cell is included in the prohibited RAT, the access inspection fails. Otherwise, the access check successes. If the access check fails, eNB2 transmits a handover preparation failure in step 1505. In the condition that access check successes, base station 2 selects a serving PLMN in the PLMN IDs broadcasted by the re-establishment cell and the PLMN ID is the rPLMN ID or ePLMN ID of the UE. Base station 2 takes the newly-selected PLMN as the rPLMN, and takes the previous rPLMN and other ePLMNs as ePLMNs that are put in a HRL. Base station 2 put the newly-selected PLMN ID in the TAI, and transmits the TAI to the MME in step 1206.

In step 1505, eNB2 transmits a handover request confirmation message to eNB1. In the condition that the access check successes, or the access check and the security check success, eNB2 transmits the handover request confirmation message to eNB1.

In a re-establishment scenario, the handover request confirmation message may not include a transparent container from a target base station to a source base station.

Steps 1505 and 1203 are transmitted by eNB2. There is no absolute order between step 1305 and step 1203, which is not limited in the present disclosure.

It should be noted that, in the condition that there is no X2 interface between base station 2 and base station 1, the messages of steps 1501-1505 can be transmitted via a S1 interface. When base station 2 transmits the UE information request to base station 1 in the S1 interface via an MME, the UE information request includes the TAI and ECGI of the cell where the failure occurs that is received from the UE in step 1201. TAI is used for routing among core networks and finding the MME with which base station 1 connects. The MME connected with base station 1 finds base station 1 by use of the ECGI of the cell where the failure occurs.

Figure 16:
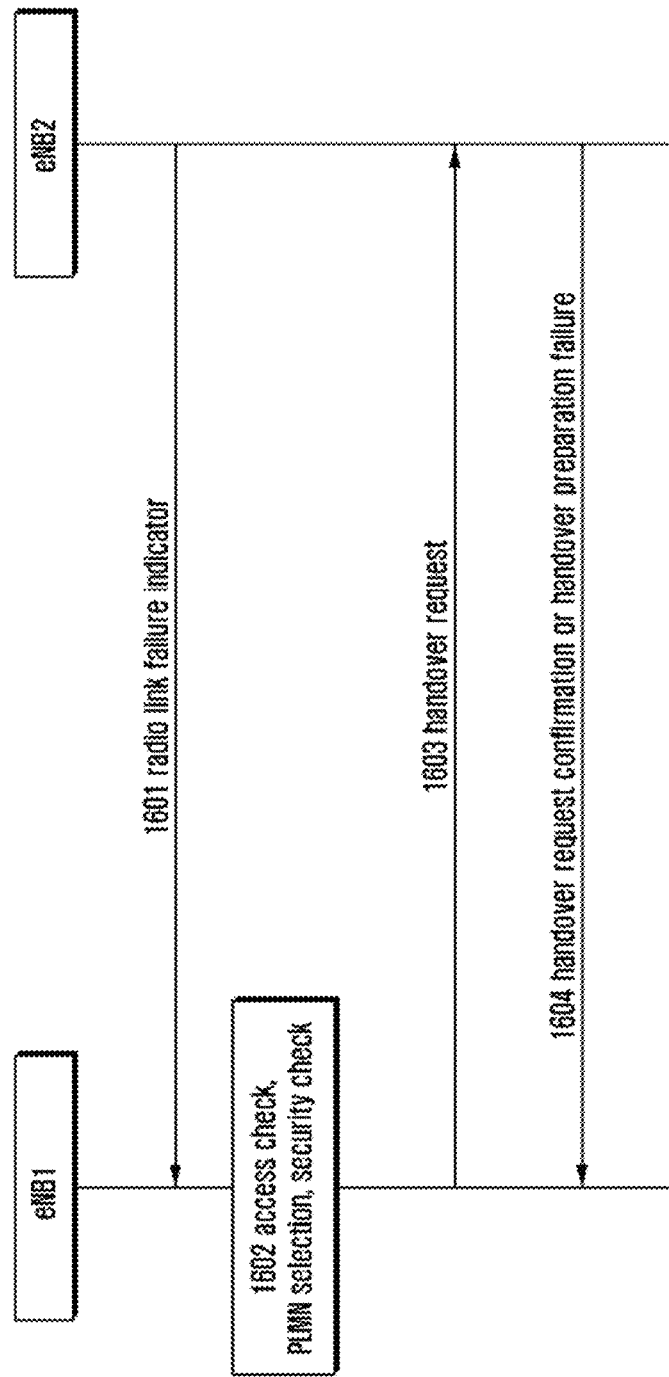
FIG. 16 is a schematic diagram illustrating a fourth method that a base station obtains UE context from another base station.

A forth method is as shown in FIG. 16, which includes the following steps.

In step 1601, base station 2 transmits a radio link failure indication message to base station 1. The message includes a PCI of the cell where the failure occurs, a C-RNTI of the UE in the cell where the failure occurs, a shortMAC-I received from UE in RRC connection re-establishment request message and an ECGI of a re-establishment cell. The message can also include the ECGI of the cell where the failure occurs. The message can also include an indicator whether base station 2 requests UE context. In the condition that base station 2 has not the UE context, the message includes an indicator of requesting the UE context. In the condition that base station 2 includes the indicator of requesting the UE context, a RRC connection re-establishment reject message is not transmitted to the UE for the moment. After a message in step 1603 is received, a message in step 1203 is transmitted to the UE. Alternatively, in the condition that the message in step 1603 is not received, the RRC connection re-establishment reject message is transmitted to the UE.

In step 1602, base station 1 performs security check, access check for the UE, and performs PLMN selection.

When the radio link failure indication message received by base station 1 includes the indicator of requesting the UE context, base station 1 performs the security check, the access check for the UE, and performs the PLMN selection.

Base station 1 knows the PCI of the re-establishment cell, supported PLMN ID(s), a TAC and frequency information according to the ECGI of the re-establishment cell received from base station 2 and an ECGI, a PCI, a supported PLMN ID(s) and a TAC of a serving cell in base station 2 obtained during the process of establishing a X2 interface.

A method that base station 1 performs the security check for the UE is that: base station 1 performs the security check for the UE by use of the PCI or the ECGI of the cell where the failure occurs and obtained from step 1601, CRNTI of the UE in the cell where the failure occurs and the shortMACI. Base station 1 can find the cell where the failure occurs according to the PCI of the cell where the failure occurs. In order to avoid PCI confusion, base station 1 can find the cell where the failure occurs according to the ECGI of the cell where the failure occurs received in step 1601 or PCI and the frequency information of the cell where the failure occurs. Base station 1 finds the UE context according to the CRNTI of the UE in the cell where the failure occurs. Base station 1 computes the shortMACI according to cell identifier PCI of the re-establishment cell and security context in the UE context. If the shortMACI computed and the shortMACI received from base station 1 are same, the UE passes the security PCI or. Otherwise, the UE does not pass the security PCI.

A method that base station 1 performs the access PCI or for the UE is that: base station 1 performs the access PCI or according to the cell identifier of the re-establishment cell and a HRL of the UE. Base station 1 determines whether PLMN IDs broadcasted in the re-establishment cell includes a registered PLMN (rPLMN) ID or an equivalent PLMN (ePLMN) ID, determines whether the re-establishment cell is not in a tracking area (TA) prohibited for the UE and determines whether the re-establishment cell is not in a radio access technology (RAT) prohibited for the UE. Base station 1 can obtain the cell identifier of the cell in base station 2, a TAC supported by the cell in base station 2 and a PLMN ID list of the cell in base station 2 through X2 setup procedure. Afterwards, base station 1 knows a PLMN ID list broadcasted by the cell in base station 2 and the TA where the cell in base station 2 locates according to the PCI or the ECGI of the cell in base station 2 received in step 1601 and information obtained during X2 setup procedure. The message in step 1601 can include the TA (TAC or TAI) of the re-establishment cell and the broadcasted PLMN ID list. If the PLMN ID broadcasted by the re-establishment cell does not include the rPLMN or the ePLMN of the UE, or the re-establishment cell is included in a prohibited TA, or the re-establishment cell is included in a prohibited RAT for the UE, the access check fails. Otherwise, the access check successes. Base station 1 knows the RAT to which the re-establishment cell belongs according to frequency of the re-establishment cell or configuration. In the condition that the access check successes, base station 1 selects a serving PLMN in one or more PLMN IDs broadcasted by the re-establishment cell and the PLMN ID is the rPLMN ID or ePLMN ID of the UE. Base station 1 takes the newly-selected PLMN as the rPLMN, and takes the previous rPLMN and other ePLMNs as ePLMNs that are put in a HRL. The new HRL is transmitted to base station 2 in step 1603.

In the condition that the security check and the access check success, base station 1 transmits the handover request message in step 1603 to base station 2.

In the condition that either the security check or the access check fails, base station 1 does not transmits the message in step 1603. eNB2 knows UE context request failure according to an implementation way, e.g., a timer mechanism. Thus, the RRC connection reject message is transmitted to the UE in step 1203.

In another method, the security check can also be performed after base station 2 receives the handover request message from base station 1 in step 1603. Thus, security check in this step can be skipped. Corresponding to this way, the handover request message in step 1603 can include the security context of the UE in the cell where the failure occurs. Base station 2 computes the shortMACI according to cell identifier PCI of the re-establishment cell and the security context in the UE context received from base station 1. If the shortMACI computed and the shortMACI received from the UE in step 1201 are same, the UE passes the security check. Otherwise, the UE does not pass the security check. Base station 2 transmits the RRC connection re-establishment reject message to UE in step 1203.

In step 1603, eNB1 transmits the handover request message to eNB2.

In another method, the message in step 1601 may not include the indicator of requesting the UE context. If the message in step 1601 includes a RRC connection establishment indicator to indicate that the radio link failure is triggered by RRC connection establishment, base station 1 does not need to transmit the message in this step. If the radio link failure indicator is triggered by the RRC connection re-establishment and base station 1 has not perform handover preparation to the re-establishment cell in base station 2, base station 1 can trigger the process in the step.

The target cell identifier in the handover request message is the ECGI of the re-establishment cell received from base station 2 in step 1601. The security information in the handover request message is computed according to the PCI and the frequency of the re-establishment cell. eNB1 can obtain the frequency of the re-establishment cell during the process of establishing a X2 interface between eNB1 and eNB2. Alternatively, the frequency of the re-establishment cell is included in step 1301.

Base station 1 transmits the HRL information of the UE to base station 2.

In step 1604, eNB2 transmits a handover request confirmation message to eNB1. In the condition that resource in eNB2 is not enough or other abnormal conditions, base station 2 can transmit a handover preparation failure message to base station1. In this condition, a RRC connection re-establishment reject message is transmitted to the UE in step 1203.

For the re-establishment scenario, the handover request confirmation message may not include a transparent container from a target base station to a source base station.

Base station 2 implements step 1604 and 1203. There is no absolute order between step 1604 and step 1203, which is not limited in the present disclosure.

It should be noted that, in the condition that there is no X2 interface between base station 2 and base station 1, the messages of steps 1601-1604 can be transmitted via a S1 interface. When base station 2 transmits the radio link failure indicator to base station 1 in the S1 interface via an MME, the radio link failure indicator includes the TAI and the ECGI of the cell where the failure occurs received from the UE in step 1201. TAI is used for routing among core networks and finding the MME with which base station 1 connects. The MME connected with base station 1 finds base station 1 by use of the ECGI of the cell where the failure occurs.

In step 1203, base station 2 transmits a RRC connection re-establishment message to the UE. If the access check or the security check fails for the UE in step 1202, base station 2 transmits a RRC connection re-establishment reject message to the UE in this step.

In step 1204, the UE transmits a RRC connection re-establishment complete message to base station 2. In the condition of receiving the RRC connection re-establishment message in step 1203, the UE transmits the RRC connection re-establishment complete message to base station 2.

In step 1205, a process of RRC connection reconfiguration between base station 2 and the UE is performed. Base station 2 transmits a RRC connection reconfiguration message to the UE. The UE transmits a RRC connection reconfiguration complete message to base station 2.

In step 1206, base station 2 transmits a path switch request message to a MME serving the UE to request that the core network hands over a downlink user plane. Herein, base station 2 obtains the MME serving the UE according to the UE context information received from base station 1 in step 1202.

In step 1207, the MME transmits a downlink path switch response message to base station 2.

In both steps 1206 and 1203, base station 2 sends out messages. There is not an absolute order for the two messages themselves, which is not limited in the present disclosure.

In step 1208, base station 2 requests resource release to base station 1. In the present disclosure, the method can include or not include the step. If the step is not performed, after base station 1 has no data to be forwarded and receives end marker from a MME, resource assigned for the UE and UE context are released. If the step is performed, after base station 1 receives the message, has no the data to be forwarded and base station 1 receives the end marker from the MME, the resource assigned for the UE and the UE context are released.

So far, the process for the method as shown in FIG. 12 ends.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:
receiving a first radio resource control (RRC) message from a user equipment (UE);
transmitting a UE context request message associated with the UE to a last serving base station;
receiving a UE context response message associated with the UE from the last serving base station;
transmitting a path switch request message to a mobility management node associated with the UE based on the UE context response message;
receiving a path switch response message from the mobility management node associated with the UE; and
transmitting information associated with releasing a context of the UE to the last serving base station based on the path switch response message,
wherein the UE context request message includes a base station UE application protocol (AP) identifier allocated by the base station and an identifier of the UE allocated by the last serving base station for identifying a context of the UE, and
wherein the UE context response message includes the base station UE AP identifier allocated by the base station and a base station UE AP identifier allocated by the last serving base station.

2. The method of claim 1, wherein the UE context request message includes at least one of a cell identifier of the base station, or a short Media Access Control (MAC) identifier (shortMACI).

3. The method of claim 2, wherein a security check is performed by the last serving base station based on the shortMACI included in the UE context request message, and
wherein a resource allocated for the UE and the context of the UE is released based on the information associated with releasing the context of the UE.

4. The method of claim 1, wherein the UE context response message includes at least one of information associated with the mobility management node, security information of the UE, capability information of the UE, or a mobility restriction list.

5. A base station in a wireless communication system, the base station comprising:
a transceiver; and
a controller configured to:

receive, via the transceiver from a user equipment (UE), a first radio resource control (RRC) message, transmit, to a last serving base station via the transceiver, a UE context request message associated with the UE, receive, from the last serving base station via the transceiver, a UE context response message associated with the UE, transmit, to a mobility management node associated with the UE via the transceiver, a path switch request message based on the UE context response message, receive, from the mobility management node associated with the UE via the transceiver, a path switch response message, and transmit, to the last serving base station via the transceiver, information associated with releasing a context of the UE based on the path switch response message, wherein the UE context request message includes a base station UE application protocol (AP) identifier allocated by the base station and an identifier of the UE allocated by the last serving base station for identifying a context of the UE, and wherein the UE context response message includes the base station UE AP identifier allocated by the base station and a base station UE AP identifier allocated by the last serving base station.

6. The base station of claim 5, wherein the UE context request message includes at least one of a cell identifier of the base station, or a short Media Access Control (MAC) identifier (shortMACI).

7. The base station of claim 6, wherein a security check is performed by the last serving base station based on the shortMACI included in the UE context request message, and wherein a resource allocated for the UE and the context of the UE is released based on the information associated with releasing the context of the UE.

8. The base station of claim 5, wherein the UE context response message includes at least one of information associated with the mobility management node, security information of the UE, capability information of the UE, or a mobility restriction list.

9. A method performed by a last serving base station in a wireless communication system, the method comprising:

receiving a user equipment (UE) context request message associated with a UE from a base station, wherein the UE context request message includes a base station UE application protocol (AP) identifier allocated by the base station and an identifier of the UE allocated by the last serving base station for identifying a context of the UE;

identifying the context of the UE based on the identifier of the UE;

performing a security check based on the UE context request message associated with the UE;

transmitting a UE context response message associated with the UE to the base station based on a success of the security check; and receiving information associated with releasing a context of the UE from the base station, wherein the UE context response message includes the base station UE AP identifier allocated by the base station and a base station UE AP identifier allocated by the last serving base station.

10. The method of claim 9, wherein the UE context request message includes at least one of a cell identifier of the base station, or a short Media Access Control (MAC) identifier (shortMACI).

11. The method of claim 10, wherein a path switch request message is transmitted from the base station to a mobility management node associated with the UE based on the UE context response message, wherein a path switch response message is received at the base station from the mobility management node associated with the UE, wherein the information associated with releasing the context of the UE is transmitted from the base station based on the path switch response message, wherein the security check is performed by the last serving base station based on the shortMACI included in the UE context request message, and wherein a resource allocated for the UE and the context of the UE is released based on the information associated with releasing context of the UE.

12. The method of claim 9, wherein the UE context response message includes at least one of information associated with a mobility management node, security information of the UE, capability information of the UE, or a mobility restriction list.

13. A last serving base station in a wireless communication system, the last serving base station comprising:

a transceiver; and a controller configured to:

receive, from a base station via the transceiver, a user equipment (UE) context request message associated with a UE, wherein the UE context request message includes a base station UE application protocol (AP) identifier allocated by the base station and an identifier of the UE allocated by the last serving base station for identifying a context of the UE, identify the context of the UE based on the identifier of the UE, perform a security check based on the UE context request message associated with the UE, transmit, to the base station via the transceiver, a UE context response message associated with the UE based on a success of the security check, and receive, from the base station via the transceiver, information associated with releasing a context of the UE, wherein the UE context response message includes the base station UE AP identifier allocated by the base station and a base station UE AP identifier allocated by the last serving base station.

14. The last serving base station of claim 13, wherein the UE context request message includes at least one of a cell identifier of the base station, or a short Media Access Control (MAC) identifier (shortMACI).

15. The last serving base station of claim 14, wherein a path switch request message is transmitted from the base station to a mobility management node associated with the UE based on the UE context response message, wherein a path switch response message is received at the base station from the mobility management node associated with the UE, wherein the information associated with releasing the context of the UE is transmitted from the base station based on the path switch response message, wherein the security check is performed by the last serving base station based on the shortMACI included in the UE context request message, and wherein a resource allocated for the UE and the context of the UE is released based on the information associated with releasing context of the UE.

16. The last serving base station of claim 13, wherein the UE context response message includes at least one of information associated with a mobility management node, security information of the UE, capability information of the UE, or a mobility restriction list.

17. A method performed by a user equipment (UE) in a wireless communication system, the method comprising:
   transmitting a first radio resource control (RRC) message to a base station; and
   receiving a last serving RRC message associated with an RRC connection from the base station,
   wherein a UE context request message associated with the UE is transmitted from the base station to a last serving base station based on reception of the first RRC message,
   wherein the last serving RRC message associated with the RRC connection is transmitted from the base station, based on reception of a UE context response message associated with the UE at the base station,
   wherein the UE context request message includes a base station UE application protocol (AP) identifier allocated by the base station and an identifier of the UE allocated by the last serving base station for identifying a context of the UE, and
   wherein the UE context response message includes the base station UE AP identifier allocated by the base station and a base station UE AP identifier allocated by the last serving base station.

18. The method of claim 17, wherein the UE context request message includes at least one of a cell identifier of the base station, or a short Media Access Control (MAC) identifier (shortMACI).

19. The method of claim 17, wherein the UE context response message includes at least one of information associated with a mobility management node, security information of the UE, capability information of the UE, or a mobility restriction list.

20. A user equipment (UE) in a wireless communication system, the UE comprising:
   a transceiver; and
   a controller configured to:
   transmit, to a base station via the transceiver, a first radio resource control (RRC) message, and
   receive, from the base station via the transceiver, a last serving RRC message associated with an RRC connection,
   wherein a UE context request message associated with the UE is transmitted from the base station to a last serving base station based on reception of the first RRC message,
   wherein the last serving RRC message associated with the RRC connection is transmitted from the base station, based on reception of a UE context response message associated with the UE at the base station,
   wherein the UE context request message includes a base station UE application protocol (AP) identifier allocated by the base station and an identifier of the UE allocated by the last serving base station for identifying a context of the UE, and
   wherein the UE context response message includes the base station UE AP identifier allocated by the base station and a base station UE AP identifier allocated by the last serving base station.

21. The UE of claim 20, wherein the UE context request message includes at least one of a cell identifier of the base station, or a short Media Access Control (MAC) identifier (shortMACI).

22. The UE of claim 20, wherein the UE context response message includes at least one of information associated with a mobility management node, security information of the UE, capability information of the UE, or a mobility restriction list.

* * * * *